(12) United States Patent
Buck et al.

(10) Patent No.: US 7,363,824 B2
(45) Date of Patent: Apr. 29, 2008

(54) FLOW SENSOR

(75) Inventors: Robert Buck, Ulferstrasse 26b, Wasserburg (DE) 88142; Berthold Schocker, Tettnang (DE); Peter Buhl, Tettnang (DE)

(73) Assignee: Robert Buck, Wasserburg (DE)

( * ) Notice: Subject to any disclaimer, the term of this patent is extended or adjusted under 35 U.S.C. 154(b) by 0 days.

(21) Appl. No.: 11/570,868

(22) PCT Filed: Jun. 16, 2005

(86) PCT No.: PCT/EP2005/006470

§ 371 (c)(1),
(2), (4) Date: Dec. 18, 2006

(87) PCT Pub. No.: WO2005/124291

PCT Pub. Date: Dec. 29, 2005

(65) Prior Publication Data

US 2008/0011076 A1    Jan. 17, 2008

(30) Foreign Application Priority Data

| Jun. 16, 2004 | (DE) | ............... 10 2004 028 759 |
| Aug. 28, 2004 | (DE) | ............ 20 2004 013 488 U |
| Feb. 9, 2005 | (DE) | ............... 10 2005 005 996 |

(51) Int. Cl.
*G01F 1/37* (2006.01)

(52) U.S. Cl. .................................. 73/861.52

(58) Field of Classification Search ............. 73/861.52, 73/861.79, 861.74; 417/26
See application file for complete search history.

(56) References Cited

U.S. PATENT DOCUMENTS 4,124,332 A * 11/1978 Nishijyo ...................... 417/26

(Continued)

FOREIGN PATENT DOCUMENTS

DE      19620699 C1     11/1997

(Continued)

OTHER PUBLICATIONS

International Search Report of PCT/EP2005/006470.

*Primary Examiner*—Jewel Thompson
(74) *Attorney, Agent, or Firm*—David S. Safran

(57) ABSTRACT

A flow sensor for flowing media with a cylindrical housing (2) and with a sensor element located in the housing (2), the housing (2) preferably having an outside thread (3) and being screwable into a union (4) of a pipe (5) or into an opening of a connecting piece (43). The flow sensor (1) has very high measurement accuracy while still being economically producible. There is a lifting body (6) which projects into the flowing medium, the lifting body (6) being movably guided on the housing (2) and depending on the flow (7) of the medium to be monitored, can be moved against the reset force of a reset element which is located between the housing (2) and the lifting body (6), and the sensor element is made as a noncontact proximity switch (18, 20) which produces a signal that is dependent on the position of the lifting body (6).

32 Claims, 18 Drawing Sheets

U.S. PATENT DOCUMENTS

| | | |
|---|---|---|
| 5,115,684 A | 5/1992 | Haeussler |
| 5,295,396 A * | 3/1994 | Lalin et al. ............... 73/861 |
| 5,593,004 A * | 1/1997 | Blain ..................... 187/275 |
| 5,711,145 A * | 1/1998 | Perkey ................. 60/39.281 |
| 5,827,978 A * | 10/1998 | Kadlicko ............. 73/861.54 |
| RE36,022 E * | 1/1999 | Blain ..................... 187/275 |
| 6,898,984 B2 | 5/2005 | Schöb |
| 6,935,191 B2 * | 8/2005 | Olivier et al. ........ 73/861.79 |
| 6,942,470 B1 * | 9/2005 | Versini ..................... 417/417 |
| 7,264,024 B2 * | 9/2007 | Funt et al. ................. 141/2 |

FOREIGN PATENT DOCUMENTS

| | | |
|---|---|---|
| DE | 29823702 U1 | 12/1999 |
| EP | 0625790 A1 | 11/1994 |
| FR | 2777081 A1 | 10/1999 |
| GB | 2151383 A | 7/1985 |

* cited by examiner

FLOW SENSOR

BACKGROUND OF THE INVENTION

1. Field of the Invention

The invention relates to a flow sensor for flowing media, with a cylindrical housing and a sensor element located in the housing, the housing preferably having an outside thread and being screwable into the wall of a pipe or pipe union or into an opening of a connecting piece.

2. Description of Related Art

It was stated initially that the invention relates to a flow sensor. This flow sensor can also be called a flow indicator or flow meter. In addition, the concept of flow-rate sensor or flow-rate indicator is used for these flow sensors. Within the framework of the invention, a flow sensor is defined as both a flow indicator and flow-rate indicator, with which simply the presence or absence of a certain flow is established, and also a flow meter or flow-rate meter in which a flow value is measured, for which therefore a measured value corresponding to the flow value can be obtained.

Known flow indicators or flow meters often operate according to the calorimetric principle. For this purpose, flow sensors generally have at least one temperature measurement element and a heating element. Generally, differential temperature measurement is used. A first temperature measurement element measures the actual measurement temperature, the measurement temperature deriving from the heat output of the heating element, the temperature of the flowing medium and the flow-dependent heat transport capacity of the flowing medium. Furthermore, generally, a second temperature measurement element measures a reference temperature, but the function of the second temperature measurement element can also be assumed by the heating element. In a flow sensor using the calorimetric principle, the temperature measurement element and the heating element constitute the above mentioned sensor element or elements. These flow sensors are relatively expensive, especially compared to conventional proximity switches.

Sensors used to monitor a medium or a property of a medium, such as, for example, the pressure of a liquid or a gas, especially flow sensors, generally have a cylindrical housing, the housing being used, on the one hand, as in all sensors, to protect the sensor and the electronics which belong to it, and on the other hand, also for safe and permanent connection to the pipe carrying the medium or to a tank.

Sensors are designed either for connection to separate evaluation electronics, or are combined with the evaluation electronics as a compact unit. In particular, these compact devices generally consist of at least two parts, a bottom part and a top part, the bottom part being connected to the medium-carrying tank or pipe, and therefore, often also being called a process connection. For this purpose, the housing can be screwed either directly into a correspondingly made pipe section—a tee or process connection—or can be connected together with a special connecting piece as a complete module to the line system of a machine or tank through which the medium to be monitored flows.

Flow sensors can be used in a host of applications. For example, flow sensors can be used in process engineering systems and machine tools. In both cases, flow sensors are used to measure or monitor the flow or flow velocity of a certain medium, for example, air, water, oil or cooling lubricant.

The disadvantage in the above described sensors, especially for a flow sensor—regardless of whether the housing is made in one part or two—is that a pipeline must be cut and a tee must be installed to hold the sensor to connect the sensor or the process connection of the sensor in existing systems. This procedure is especially disadvantageous when the use of a flow sensor is to be combined only with relatively low costs. This is the case, for example, in the water supply in single or multifamily dwellings. A central water supply system in a single or multifamily dwelling generally has a hot water circuit with a hot water tank, a cold water supply and a hot and cold water line with several taps (for example, in baths, kitchen and toilets).

SUMMARY OF THE INVENTION

Therefore, the object of this invention is to provide a flow sensor of the initially described type which can be produced as economically as possible. Moreover, the flow sensor should have measurement accuracy as high as possible. According to another object of this invention, flow sensors should, moreover, be able to be integrated especially easily into an existing system, for example, into a water supply system of a single or multifamily dwelling.

The aforementioned objects are achieved in a flow sensor of the initially described type in that there is a lifting body which projects into the flowing medium, the lifting body being movably guided on the housing and depending on the flow of the medium to be monitored, can be moved against the reset force of a reset element which is located between the housing and the lifting body, and that the sensor element is made as a noncontact proximity switch and produces a signal dependent on the position of the lifting body.

A very simple flow sensor can be implemented by the arrangement of a lifting body which is movably guided in the housing, which projects into the flowing medium, and which has a position which represents a measure of the flow to be monitored. The sensor element is thus implemented by a noncontact proximity switch which is located in the housing and which delivers a signal which is dependent on the position of the lifting body.

As was stated at the beginning, with the flow sensor in accordance with the invention both simply the presence or absence of a certain flow can be established and also a flow value can be measured; i.e., a measured value corresponding to the flow value can be obtained. Thus, the noncontact proximity switch is not a binary switch in the classical sensor, but a contactless "proximity sensor" which first produces an analog signal which is dependent on the position of the lifting body and which is converted according to the configuration of the sensor element into a classical, binary switching signal or an analog or digital output signal.

Depending on whether the flow sensor in accordance with the invention, as a flowmeter, is to deliver an analog measured value corresponding to the flow value, or as a flow indicator, a binary switching signal, the signal generated by the proximity switch in a subsequent processing step is converted into a binary, analog or digital output signal. The processing unit can especially have a microprocessor in the case of a flowmeter and especially a threshold switch in the case of a flow indicator.

If the flow sensor in accordance with the invention, as a flow indicator, is to deliver a binary switching signal, preferably a proximity switch with low hysteresis and/or high operating precision is used, so that high measurement precision of the flow sensor can be achieved. The low hysteresis provides for the on point and the off point of a flow sensor which is made as switch being very close to one another so that there is only a small difference in the position of the lifting body, and thus, in the flow of the medium to be monitored between the on point and the off point.

The reset element which is located between the housing and the lifting body can be made as a mechanical, magnetic, or electromagnetic reset element. In the simplest case, a spring element is used; the lifting body is deflected by the flow of the medium against the spring force of the spring element. In addition, for certain applications, however, also a magnet-magnet arrangement or a magnet-coil arrangement can be used as the reset element. In this connection, the lifting body has at least one magnet which interacts with at least one opposing magnet located in the housing or with a coil located in the housing. Then, the magnetic repulsion force existing between the magnets or between the magnet and coil acts as the reset force.

According to one especially advantageous configuration of the flow sensor in accordance with the invention, the lifting body has a peripheral collar, the collar being made such that the flow sensor additionally has the function of a check valve. In this way, the flow sensor in accordance with the invention can be easily screwed into a pipe union, especially of the cold water supply, which is already provided for a check valve, instead of the check valve present in the water supply system. Thus, the insertion of a tee which is necessary in the use of calorimetric flow sensors into an existing pipeline for connection of the flow sensor is eliminated. Since the flow sensor is used at the same time as a check valve, no changes in the pipelines are necessary; the flow sensor easily replaces the check valve, and moreover, delivers information about the flow of the medium i.e., of the water, in the line.

In order to achieve a relative large lift of the lifting body at relatively small flows, which can then be detected even with a simple noncontact proximity switch, it is preferably provided that a cylindrical section is made on the lifting body between the end of the lifting body projecting into the pipe in the installed state and the peripheral collar. This results in that the end of the lifting body projecting into the pipe—in contrast to a normal check valve—is not made as a flat plate. Even for very small flows, a relatively large stroke of the lifting body is achieved by the execution of a cylindrical section which projects into the valve seat in the pipe when the flow sensor has been installed.

As alternative to a cylindrical section, a section with a slight conicity of 0.5° to 15°, preferably from 1° to 10°, can be made on the lifting body. In this case, then, the peripheral collar is eliminated. The advantage of a section with low conicity is that the tolerance in the diameter of the line section into which the lifting body projects, for example, of the valve seat, can be equalized by the conical region. This ensures that, for a desired diameter of the line section, a flow sensor with a corresponding lifting body diameter can also always be used.

According to a first advantageous configuration of the flow sensor in accordance with the invention, the sensor element is a magnetic proximity switch, a permanent magnet being located in the lifting body. If the lifting body is moved in the direction of the housing based on the existing flow of the medium to be monitored, this leads to a reduction of the distance between the magnetic proximity switch and the permanent magnet; this can trigger a switching signal of the flow sensor at a given distance. Instead of a binary switching signal, the flow sensor can also deliver a signal proportional to the distance of the lifting body, and thus, to the flow, especially an analog signal. For this purpose, it is important for the magnetic proximity switch itself to deliver, first, an analog signal and not simply a binary switching signal. A reed contact as the electromagnetic switch is thus not suited as a magnetic proximity switch.

The advantage in using a magnetic proximity switch as a sensor element lies in that these magnetic proximity switches have a relatively large operating distance even at a relatively small diameter so that the lifting body can execute a relatively large stroke. A GMR (giant magneto resistor) cell is, therefore, especially suited as a magnetic proximity switch. A GMR cell has the advantage not only of a relatively large operating distance, so that a flow sensor with a relatively large stroke can be implemented, but it is also well suited to implementation of an analog flow sensor. In this connection, what is evaluated is the circumstance that the signal of the GMR cell changes depending on the distance of the permanent magnet, and thus, depending on the distance of the lifting body. With corresponding dimensioning of the lifting body, especially with a tip which runs conically or in the shape of a truncated cone, the analog output signal of the magnetic proximity switch is essentially linearly proportional to the flow of the medium to be monitored.

According to one alternative embodiment of the flow sensor in accordance with the invention, the sensor element is an inductive proximity switch, especially an inductive proximity switch which can be installed to be not flush. These inductive proximity switches have been used for decades in the millions in the industrial domain, so that depending on the specific application, a host of different inductive proximity switches with different diameters and different operating distance are available. An inductive proximity switch which can be installed to be not flush, in contrast to a flush inductive proximity switch or one which can be installed flush, also has a lateral stray field since the front sensitive region of the proximity switch does not have a metal housing so that objects which have approached the proximity switch not only frontally but also laterally can be recognized. For an inductive proximity switch which can be installed to be not flush, a metal housing—if the proximity switch has a metal housing—extends only to the sensor head, i.e., as far as the coil to the pot-type core of the proximity switch.

So that an inductive proximity switch for a diameter as small as possible has a large operating distance, it is preferably provided that the sensor head of the inductive proximity switch, in addition to a coil, has a pot-type core, especially of ferrite, in which the coil is inserted. These pot-type cores have been known for a long time in inductive proximity switches, and are used to influence the spatial distribution of the field lines of the electromagnetic field of the sensor head in the desired manner.

Alternatively, the sensor head of the inductive proximity switch can have an air-core inductor, in the air-core inductor preferably a rod-shaped ferrite or iron core being located. The three-dimensional propagation of the electromagnetic field is increased by the rod-shaped ferrite or iron core. In this way, the sensitive region of the inductive proximity switch is enlarged. This is especially advantageous when the flow sensor is to be made as an analog sensor, i.e., delivers an analog output signal, since then the analog region has a length similar to the rod-shaped ferrite or iron core. The analog signal depends on the degree of damping of the inductive proximity switch.

According to a preferred design embodiment of the flow sensor in accordance with the invention, the end of the housing pointing toward the lifting body is made as a guide pin and the end of the lifting body is made sleeve-shaped so that the lifting body is guided on the guide pin. The sleeve-shaped part of the lifting body is preferably made of metal, especially high grade steel, so that it is used as the actuating element for an inductive proximity switch. When the end of the lifting body accordingly approaches the front of the inductive proximity switch, a circular current forms in the front of the sleeve-shaped part of the lifting body and exerts a strongly damping effect on the electromagnetic field of the proximity switch. This effect is known as the short-circuiting ring effect. Since an inductive proximity switch which can be installed so as not to be flush also has a lateral stray field, the proximity switch also remains further damped with a further approach of the lifting body, since the proximity switch is located continuously within the sleeve-shaped part of the lifting body. The damping of the proximity switch is proportional to the immersion depth of the proximity switch into the sleeve-shaped part of the lifting body so that an analog signal proportional to the flow can be produced.

Based on the strongly damping effect of the front of the sleeve-shaped part of the lifting body, the sleeve-shaped part of the lifting body can be made very thin so that the lifting body has altogether a light weight. This saves not only space and material, but also yields improved dynamics of the flow sensor. The sleeve-shaped part of the lifting body can have, for example, a wall thickness of only 1 mm or less. The ratio of the diameter of the sleeve-shaped part of the lifting body to the coil diameter of the inductive proximity switch can have a value of 2 to 4, preferably of 2.5 to 3.5.

Based on the short-circuiting ring effect, instead of a sleeve-shaped lifting body, only a ring-shaped lifting body is sufficient for damping. In practice, this can be implemented in that the sleeve-shaped part of the lifting body is made of plastic, in the sleeve-shaped part there being at least one metal ring. If an analog flow sensor is to be implemented with a non-flush inductive proximity switch, several metal rings located at a distance from one another can be located in the sleeve-shaped part of the lifting body. Based on the also lateral stray field of the non-flush inductive proximity switch, it can also be measured how many metal rings are located within the stray field of the proximity switch, so that damping of the proximity switch is proportional to the immersion depth into the sleeve-shaped part of the lifting body and also an analog output signal proportional to the flow can be produced in this way.

According to another configuration of the invention, the lifting body is made in two parts; the lifting body then has a first part which projects into the interior of the pipe in the installed state and a second part which points out of the interior of the pipe in the installed state. The two-part lifting body makes it possible to use different materials for the two parts of the lifting body, so that the lifting body can be better adapted to the respective conditions of use.

Advantageously, the sensor element is located in the housing such that the distance of the sensor element relative to the lifting body can be adjusted. In this way, simple setting of the operating point of the proximity switch for a flow sensor which is made as a switch and of the zero point for an analog flow sensor is possible. In the simplest case, the proximity switch has an outside thread which is screwed into the housing so that, by a corresponding screwing motion, the distance of the sensor element relative to the lifting body can be increased or decreased. For an analog flow sensor, the measurement range can also be set in this way. For example, a partial region of the maximum possible measurement range, which can then be measured with a correspondingly higher measurement precision, can be selected in this way.

According to a more convenient alternative of adjustability, a mounting bracket is screwed onto the end of the housing facing away from the lifting body and there is an adjusting nut between the end of the housing and the mounting bracket, the sensor element having an outside thread with at least one flattened lengthwise side, in the mounting bracket an opening matched to the cross section of the sensor element is formed and the adjustment nut has an inside thread which corresponds to the outside thread of the sensor element. By twisting the adjustment nut, then, the axial position of the sensor element can be set without the sensor element turning at the same time. This is especially advantageous when the sensor element is electrically connected via a connecting cable, since co-rotation of the connecting cable is prevented.

As stated above, the flow sensor in accordance with the invention can be used especially advantageously in the water supply system of a single or multifamily dwelling at the location of the check valve. Therefore, in addition to the above described flow sensor, the invention also relates to an arrangement for flow monitoring in the water supply system in a single or multifamily dwelling, with a flow sensor in accordance with the invention, the water supply system having at least a cold water supply, a service water tank and a hot water circuit with a hot water line and several taps, and a valve seat being formed in the cold water supply. In accordance with the invention, the flow sensor is located in the cold water supply instead of a check valve. As stated above, in this way, the subsequent arrangement of a tee within the existing pipeline is thus eliminated. In place of the check valve prescribed for the service water tank, simply a flow sensor can be used since it likewise assumes the function of the check valve.

In a single or multifamily dwelling, since the line paths between the hot water tank, usually located in the basement, and the individual taps are relatively long, the water supply system generally has a circulation pump and a circulation line. The circulation line provides for hot water being permanently available on the branch lines to the individual taps when the circulation pump is on.

By using a circulation pump and a circulation line, convenience in the use of a hot water supply system is greatly increased since the desired hot water is very quickly available after the tap is opened. However, this advantage is purchased at the cost of increased consumption of electricity for the circulation pump and especially by increased heat losses in the hot water lines. To reduce these losses, various measures are known for implementing "demand-oriented" control of the circulation pump. The simplest measure used most often in practice is the use of a simple time switch, resulting in that the circulation pump remains off at least during the night. By using the flow sensor in accordance with the invention, moreover, control of the circulation pump can be implemented in which the circulation pump is turned on only when water is being tapped, i.e., when there is a flow in the water line, initiated by the operating signal of the flow sensor.

In particular, there are a host of possibilities for embodying and developing the flow sensor in accordance with the invention. In this respect reference is made to the description of preferred embodiments in conjunction with the accompany drawings.

DETAILED DESCRIPTION OF THE INVENTION

Figure 1:
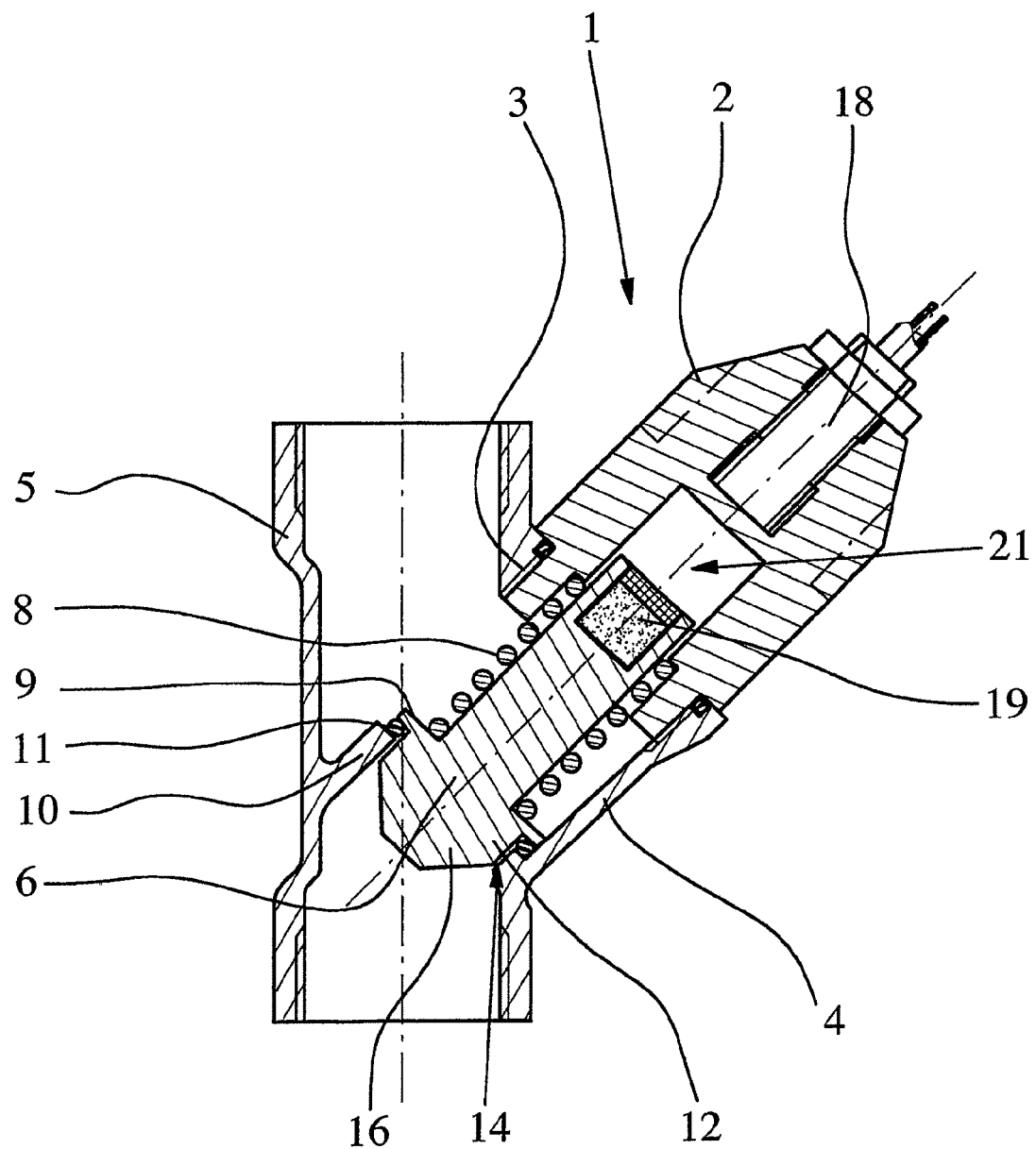
FIG. 1 is a cross-sectional view of a first embodiment of a flow sensor in accordance with the invention, installed in the water line of a water supply system, with no flow.

The figures show different embodiments of a flow sensor 1 which has a cylindrical housing 2 on which a section with an outside thread 3 is formed and by which the flow sensor 1 can be screwed into the union 4 of the pipe 5.

Figure 3:
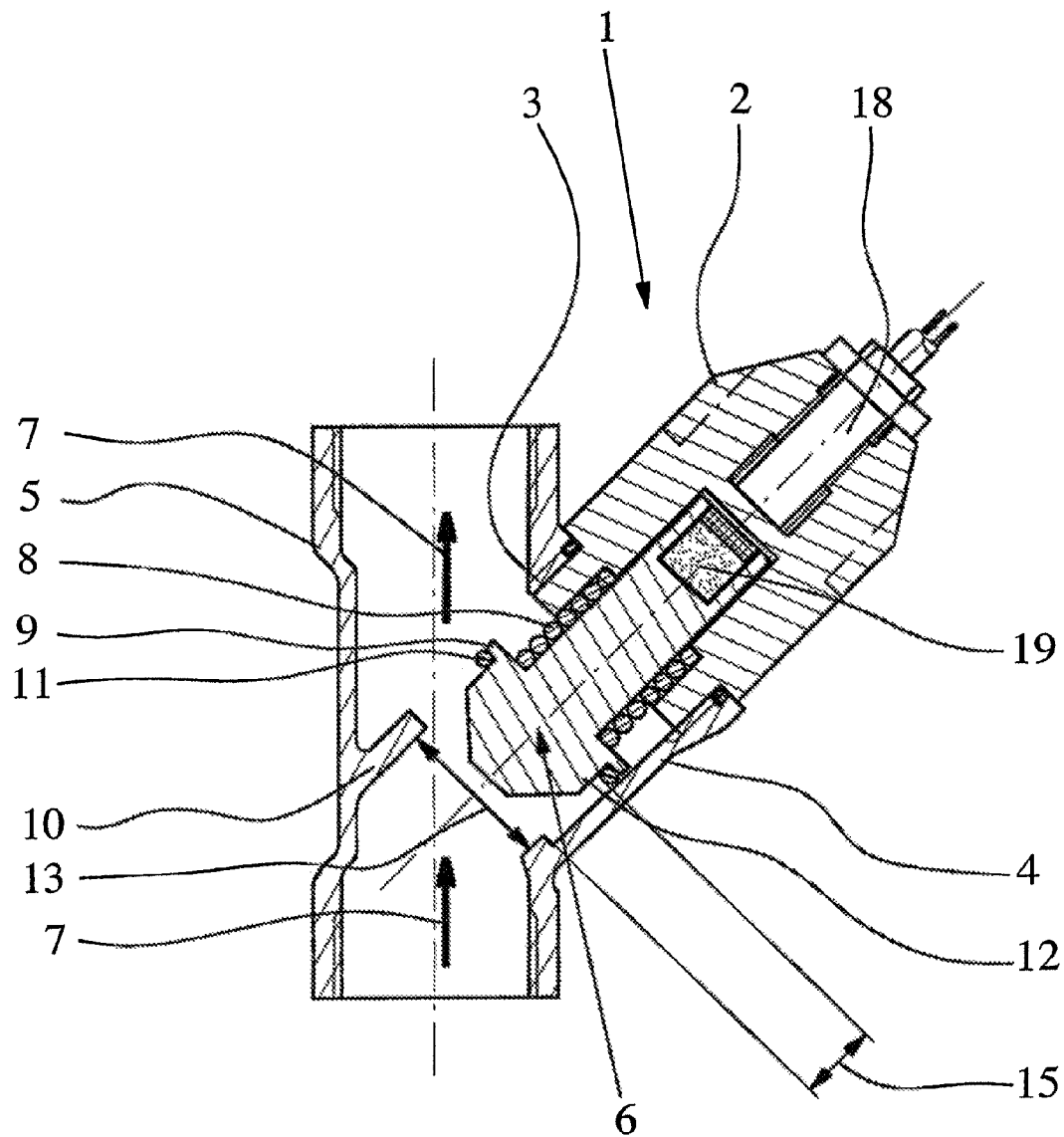
FIG. 3 shows the flow sensor of FIG. 1, with full tapping of water.
Figure 6:
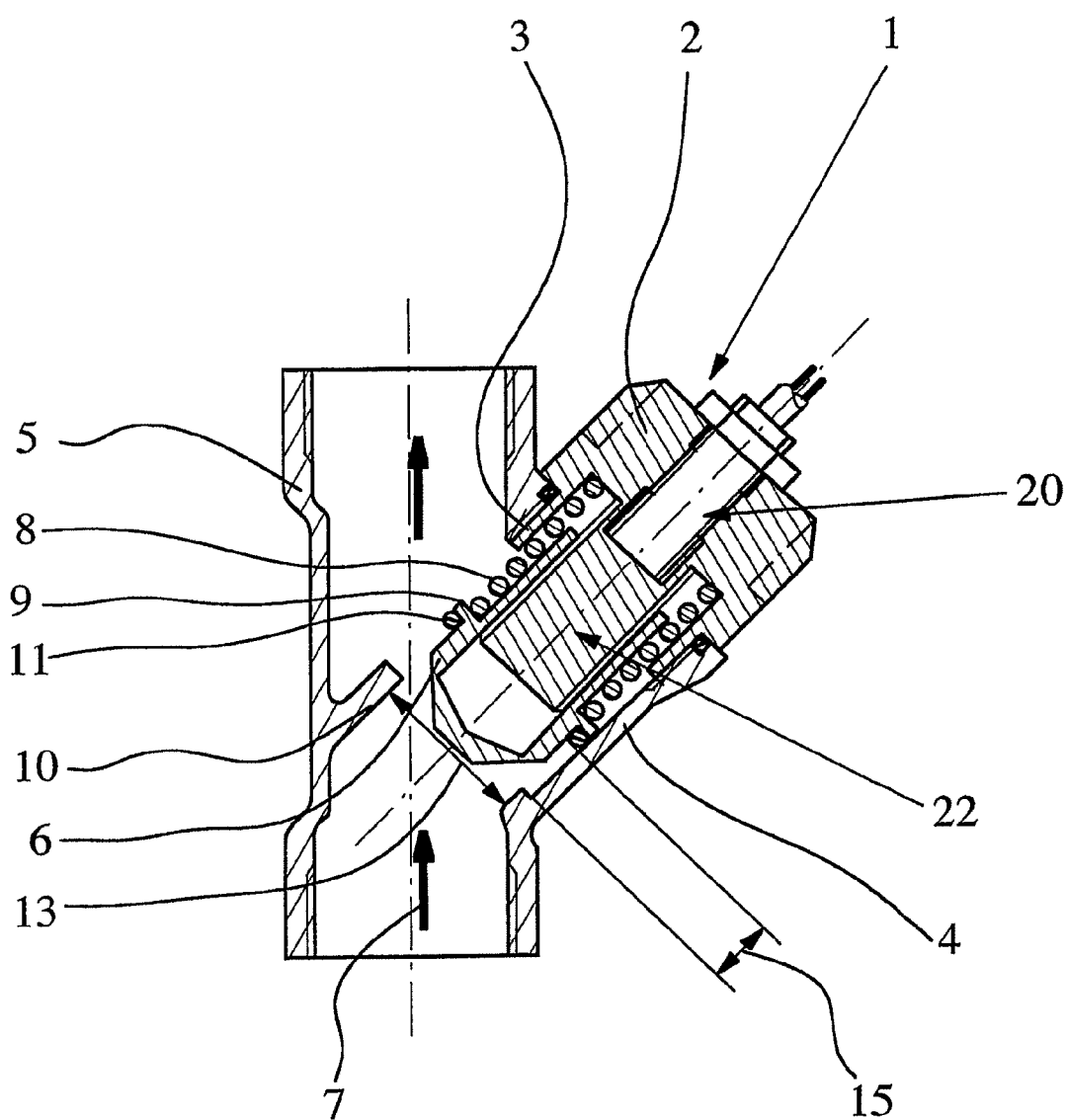
FIG. 6 shows the flow sensor of FIG. 4, with full tapping of water.

Common to the different embodiments of the flow sensor 1 in accordance with the invention shown in the figures is that there is a lifting body 6 which projects into the flowing medium, which is movably guided on the housing 2, and depending on the flow 7 of the medium to be monitored—shown in FIGS. 3 & 6 by an arrow—is pressed in the direction of the housing 2. In this connection, the lifting body 6 is deflected against the spring force of a spring element 8 located between the housing 2 and the lifting body 6.

The position of the lifting body 6 which represents a measure of the flow 7 of the medium to be monitored is evaluated by a contactless sensor element located in the housing 2. In the simplest case, only the presence or absence of a certain flow 7 is monitored. However, in addition, it is also possible to form the flow sensor 1 such that the actual flow value is measured and output as an analog or digital value.

In the embodiments as shown in FIGS. 1 to 7, 11 to 15, 17 and 18, a peripheral collar 9 is formed on the lifting body 6 such that the flow sensor 1, when installed in a corresponding pipe piece 5 which has a valve seat 10, additionally, is able to function as a check valve. To ensure a sufficient tightness, there is a gasket 11 in front of the collar 9. In the embodiments as shown in FIGS. 1 to 8, the angle between the lengthwise axis of the lifting body 6 or the lengthwise axis of the valve seat 10 and the lengthwise axis of the pipe 5 (represented by dot-dash lines in the figures) is roughly 45°, by which improved sensitivity of the flow sensors 1 is achieved that is equivalent to that achieved at an angle of 90°.

Between the end of the lifting body 6 which faces, in the installed state, into the interior of the pipe 5 and the peripheral collar 9 and the gasket 11, in the embodiments according to FIGS. 1 to 10, 12 to 14, 17 & 18, the lifting body 6 has a cylindrical section 12 which projects into the valve seat 10 when there is no flow 7. The diameter of the cylindrical section 12 is thus somewhat smaller than the opening 13 of the valve seat 10 so that there is an annular gap 14 between the cylindrical section 12 and the valve seat 10. The gasket 11 can be eliminated if, according to the version in FIGS. 9 & 10, the transition between the cylindrical section 12 and the peripheral collar 9 is made frusto-conical.

Figure 2:
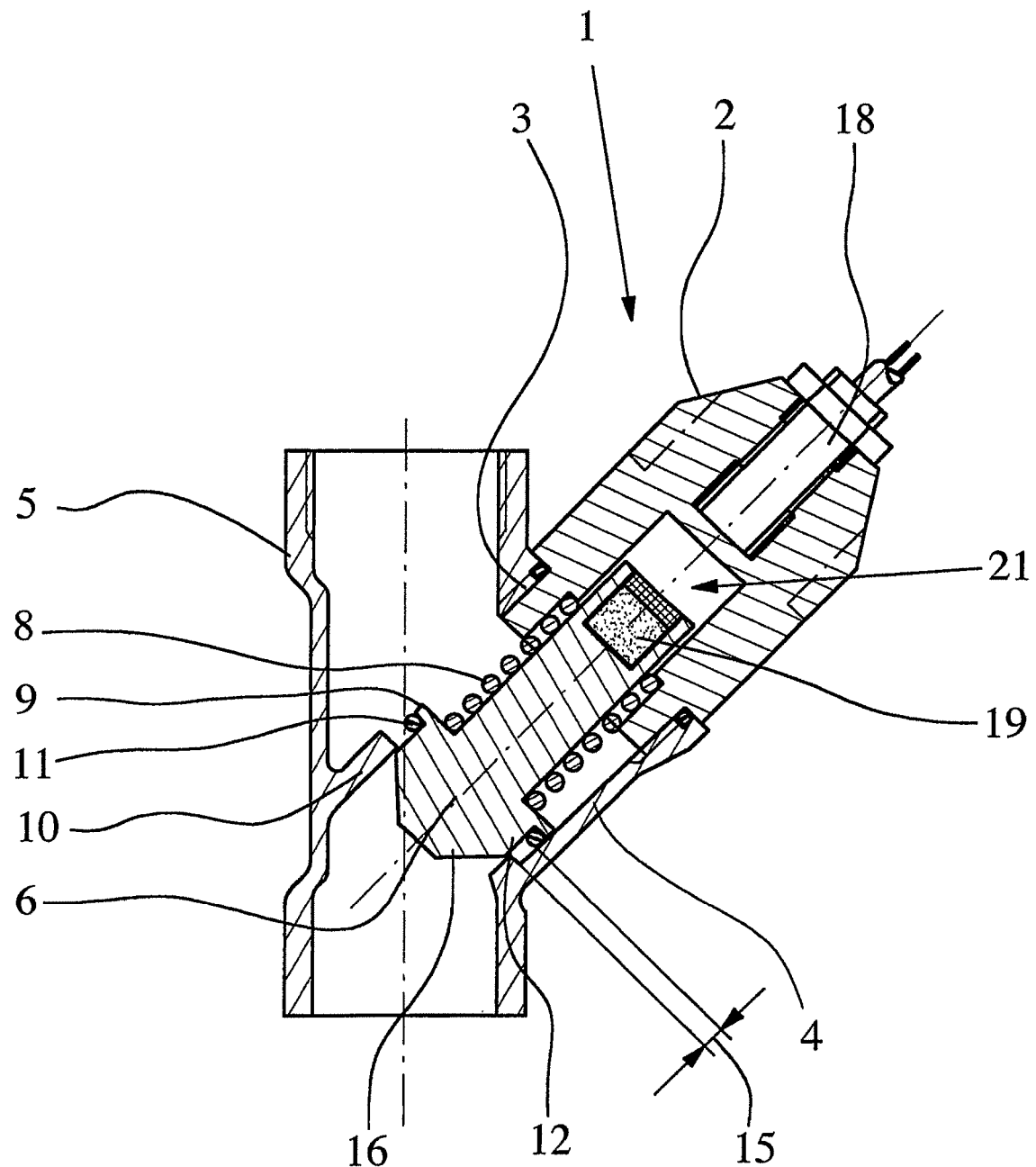
FIG. 2 shows the flow sensor of FIG. 1, at the start of tapping of water.
Figure 4:
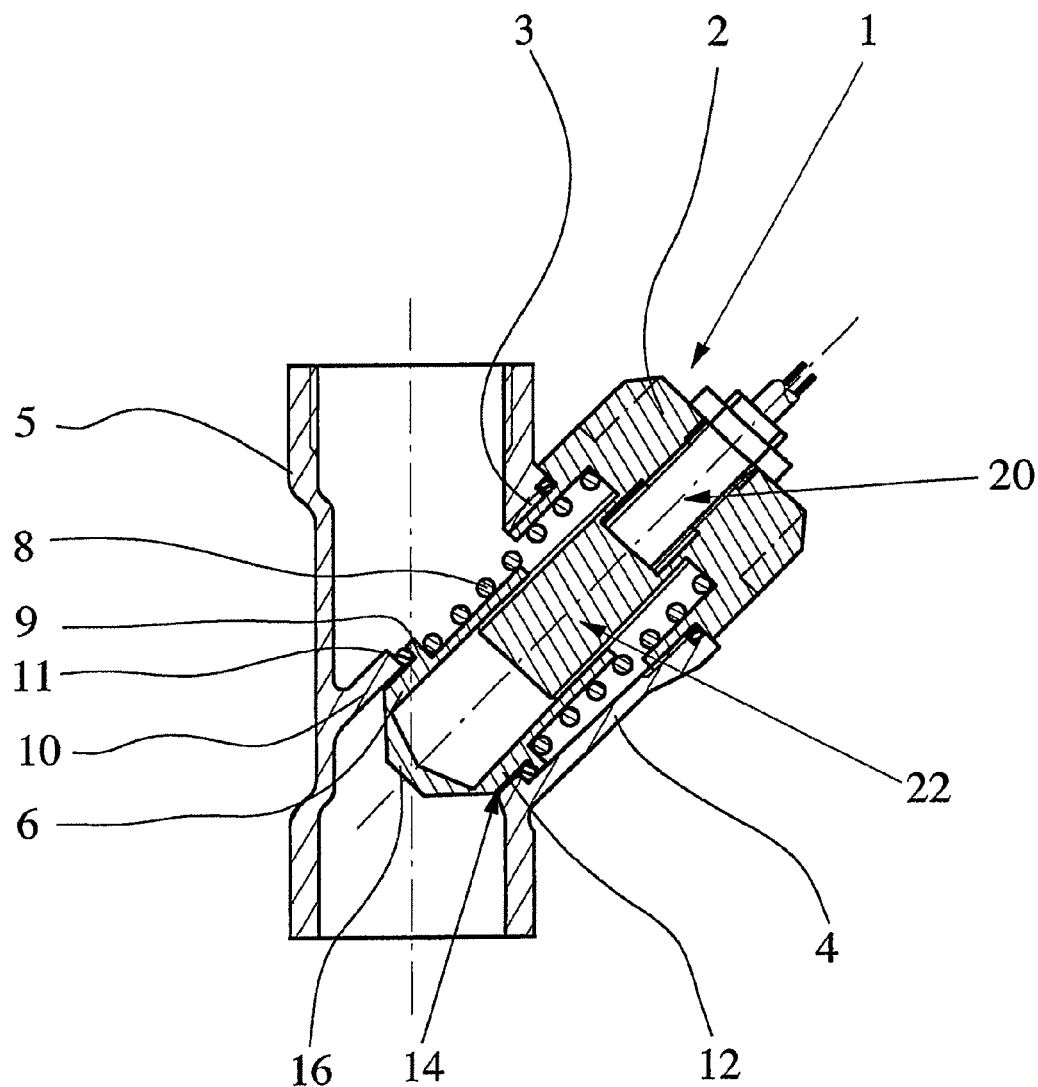
FIG. 4 is a cross-sectional view of a second embodiment of a flow sensor in accordance with the invention, installed in the water line of a water supply system, for no tapping of water.
Figure 5:
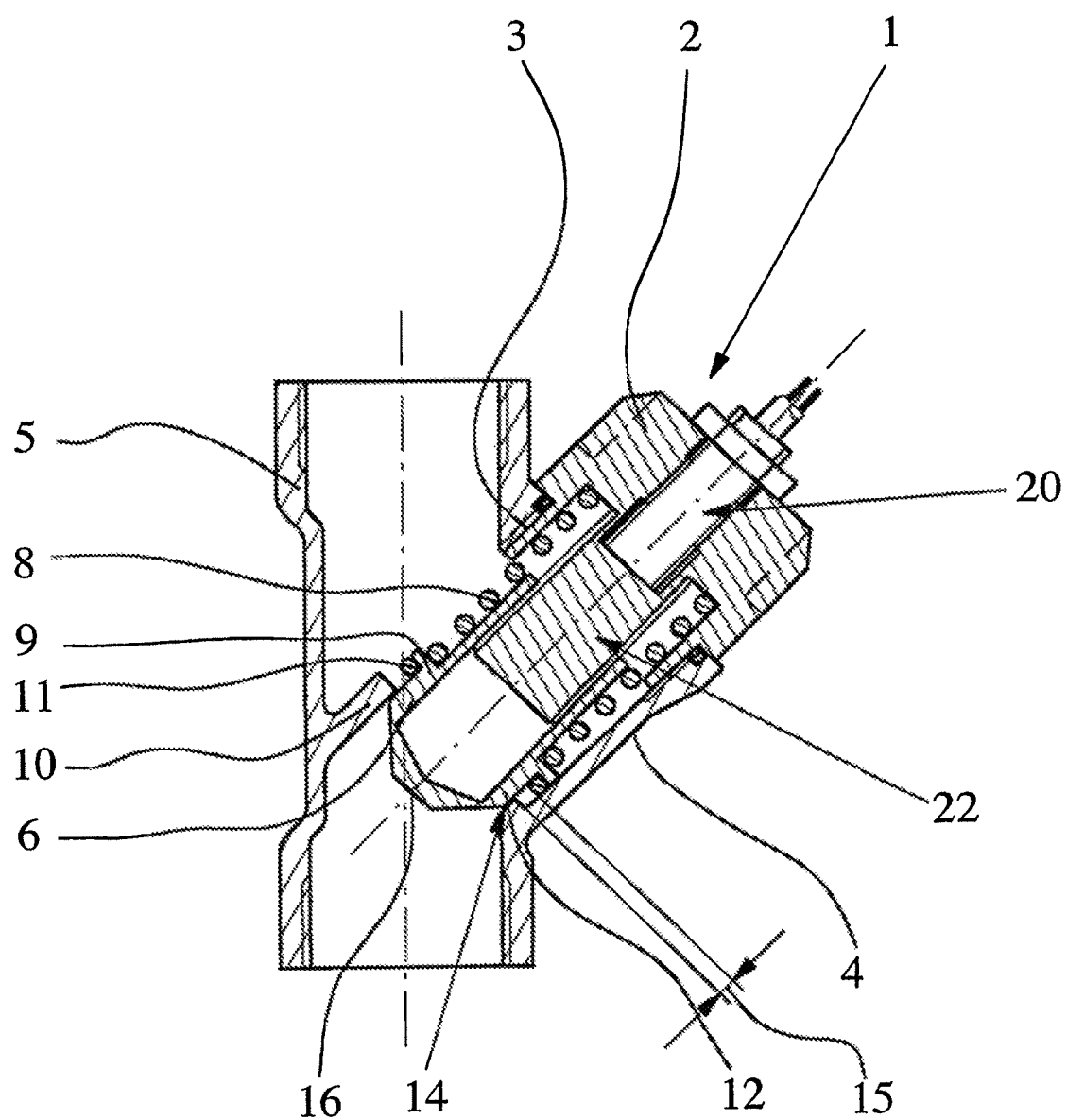
FIG. 5 shows the flow sensor of FIG. 4, with the tapping of water starting.
Figure 7:
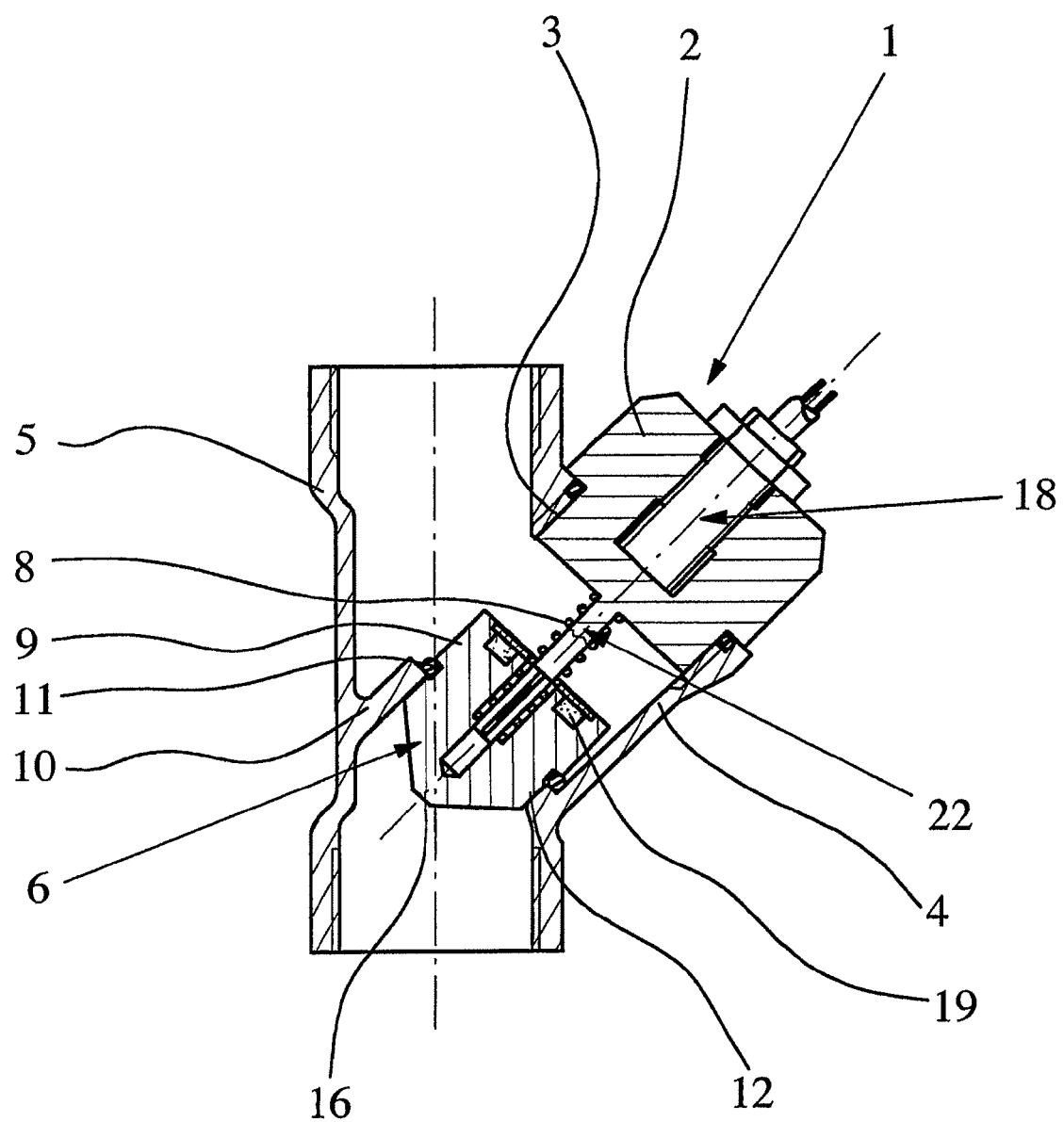
FIG. 7 is a cross-sectional view of an alternative embodiment of the flow sensor as shown in FIG. 1.
Figure 8:
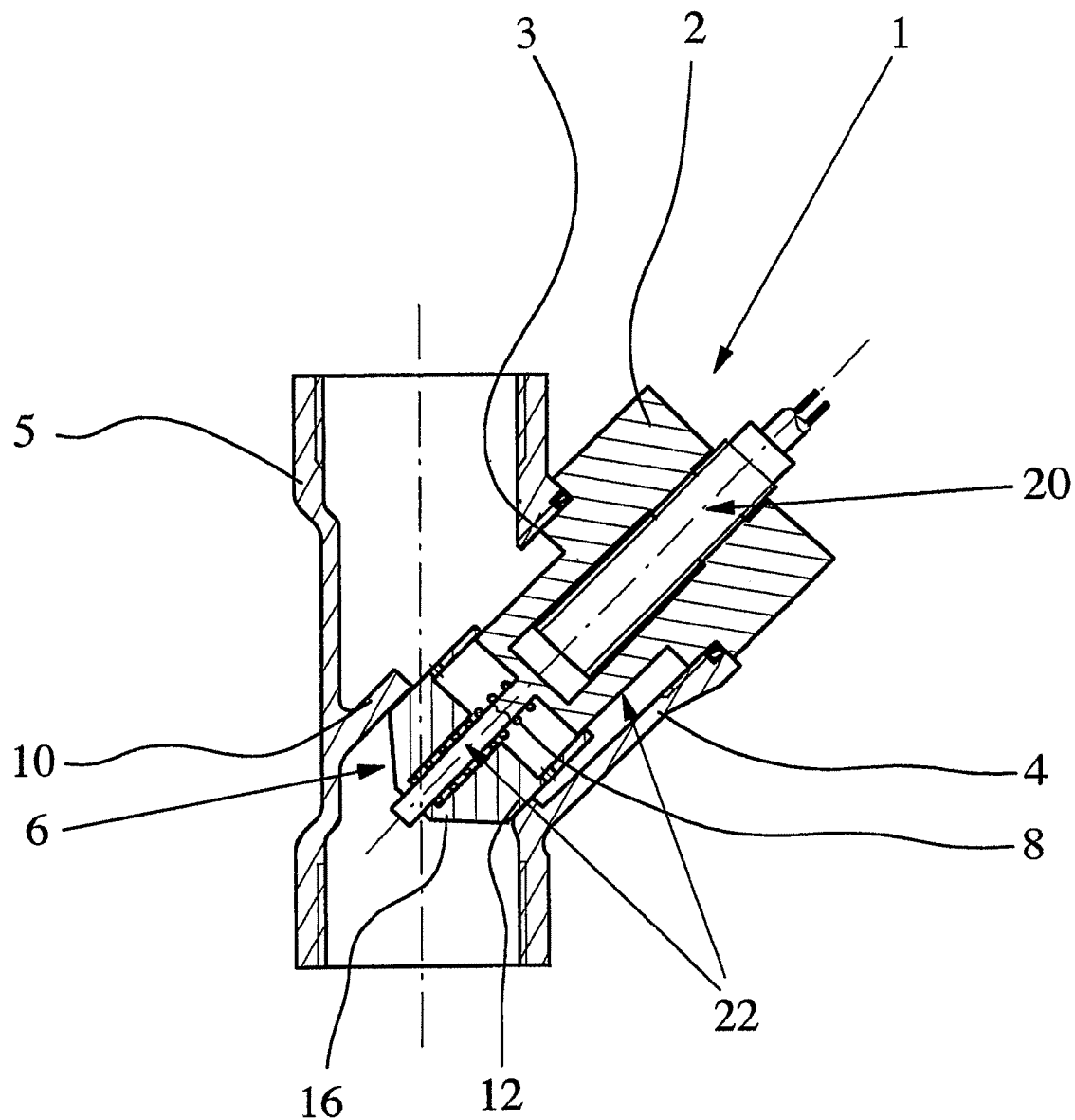
FIG. 8 is a cross-sectional view of an alternative embodiment of the flow sensor as shown in FIG. 4.

If there is no flow 7, as is shown in FIGS. 1, 4 & 7, the lifting body 6 is pressed against the valve seat 10 as a result of the spring force of the spring element 8, so that the annular gap 14 is sealed by the gasket 11. When there is a small flow 7, as is shown in FIGS. 2 & 5, the lifting body 6 is pressed by the flow 7 against the spring force of the spring element 8 toward the housing 2. The flowing medium can then flow through the gap 14 in the given direction through the pipe 5. In this connection, the execution of the cylindrical section 12 projecting into the valve seat 10 results in that, even for a relatively small flow 7, the resulting stroke 15 of the lifting body 6 is large enough so that it can be detected by the sensor element of the flow sensor 1. By the corresponding selection of the length of the cylindrical section 12 and of the gap 14, and by a corresponding dimensioning of the spring element 8, the stroke 15 which occurs at a certain flow 7 can be set. Thus, adaptation to the properties of the proximity switch used, especially to the operating point of the proximity switch, is possible by a corresponding setting of the stroke 15 at a certain flow 7.

Figure 11:
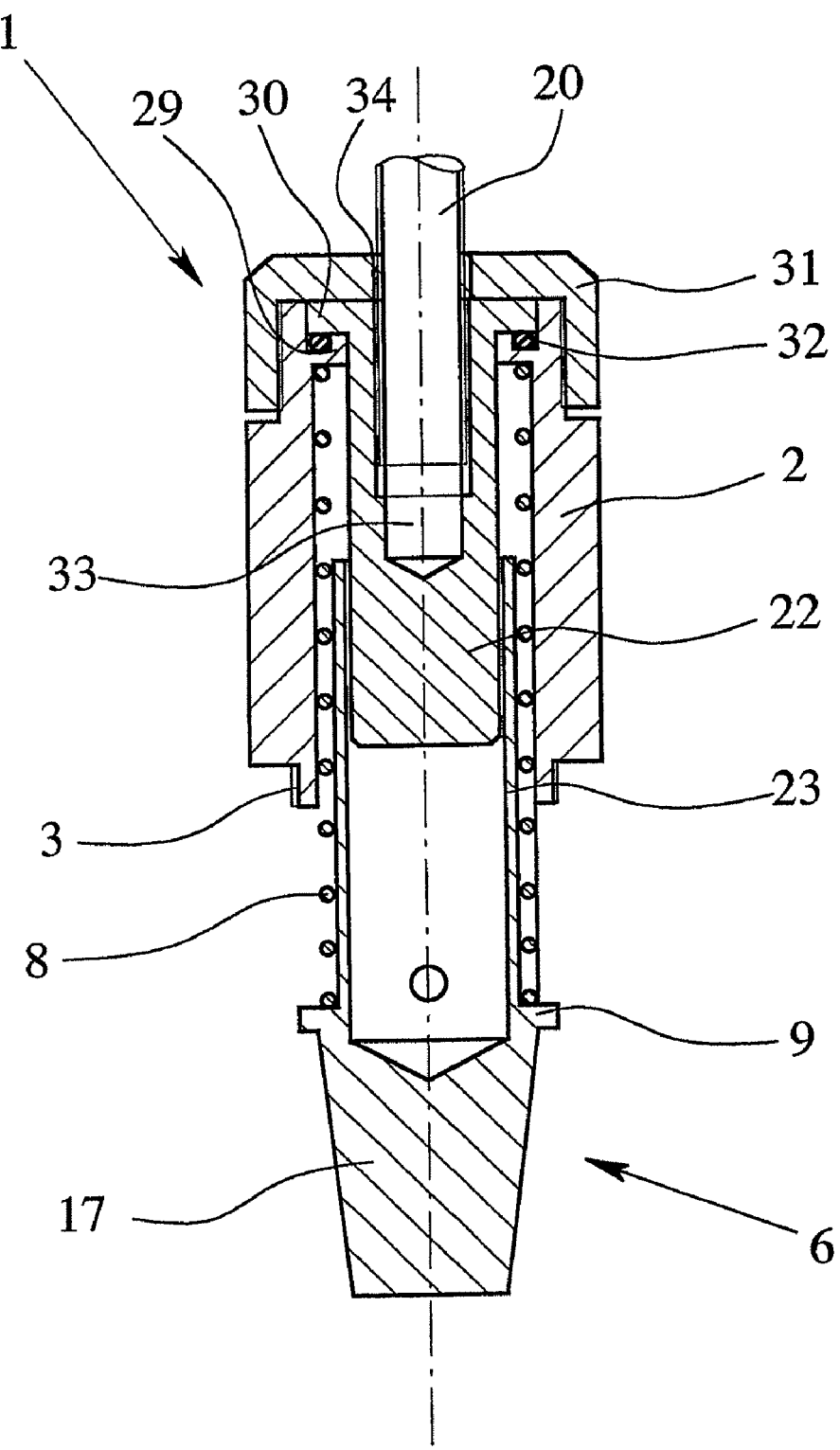
FIG. 11 is a cross-sectional view of an embodiment of a flow sensor in accordance with the invention, with an inductive proximity switch.

As is immediately apparent from the figures, the end of the lifting body 6 that faces into the interior of the pipe 5 has a tapered tip 16 or a truncated cone-shaped tip 17 (FIG. 11). By selecting the tip 16, 17, setting of the stroke 15, and thus, also of the operating point of the sensor element can likewise take place. The tip 16 of the lifting body 6 can also have the shape of an oblique truncated cone (not shown), so that the cone is not made symmetrical relative to the center axis of the lifting body 6. This can result in that the gap 14 increasing in proportion to the stroke 15.

As can be taken from FIGS. 3 & 6, the lifting body 6 is dimensioned such that, at maximum flow 7, the opening 13 is almost completely cleared so that the flow rate of the flowing medium can proceed almost unhindered. Moreover, it can be taken from the figures that, when flow occurs counter to the direction illustrated in FIGS. 3 & 6, the flow sensor 1 acts as a check valve. The spring force of the spring element 8 presses the collar 9 and the gasket 11 of the lifting body 6 against the valve seat 10 so that medium cannot flow in the opposite direction—in the representation as shown in the figures from overhead—through the pipe 5.

The embodiments of the flow sensor 1 in accordance with the invention as shown in FIGS. 1 to 3, 7, 12 to 14 and 16 to 18, on the one hand, and according to FIGS. 4 to 6, 8 to 11 and 15, on the other, differ by the use of different proximity switches. In the embodiments as shown in FIGS. 1 to 3, 7, 12 to 14 and 16 to 18, the sensor element is a magnetic proximity switch 18 which is screwed in a corresponding hole in the housing 2. To actuate the magnetic proximity switch 18, in the opposite end of the lifting body 6, there is a permanent magnet 19. In the embodiments of the flow sensor 1 as shown in FIGS. 4 to 6, 8 to 11 & 15, the sensor element is an inductive proximity switch 20 which is likewise attached in a corresponding hole in the housing 2.

The permanent magnet 19 is inserted in a hole which in the lifting body 6 and which can be sealed tight by means of a cover, or by being welded or soldered. This has the advantage that the permanent magnet 19 does not come into contact with the medium, so that damage or fouling of the permanent magnet 19 cannot occur even with corrosive media. Moreover, the components and materials which come into contact with the medium can be reduced thereby. In particular, the lifting body 6 and the cover can be made of the same material, for example, from high grade steel or from plastic.

In the flow sensor 1 shown in FIGS. 1 to 3 and 16, in the housing 2—in the end facing toward the lifting body 6—a hole 21 is formed in which the cylindrical end of the lifting body 6 which has a corresponding outside diameter is guided. In contrast, for the flow sensors 1 shown in FIGS. 4 to 15, 17 & 18, the end of the housing 2 facing toward the lifting body 6 is made as a guide pin 22 on which the lifting body 6 is guided. To do this, the lifting body 6 according to FIGS. 4 to 6, 8 to 15, 17 and 18 is made sleeve-shaped. In the flow sensor 1, as shown in FIG. 7, in which the housing 2 likewise has a guide pin 22, there is a corresponding hole in the lifting body 6. This hole is also made for the lifting body 6 of the flow sensor 1 shown in FIG. 8, where the guide pin 22 on the housing 2 has two sections with two different diameters.

Figure 9:
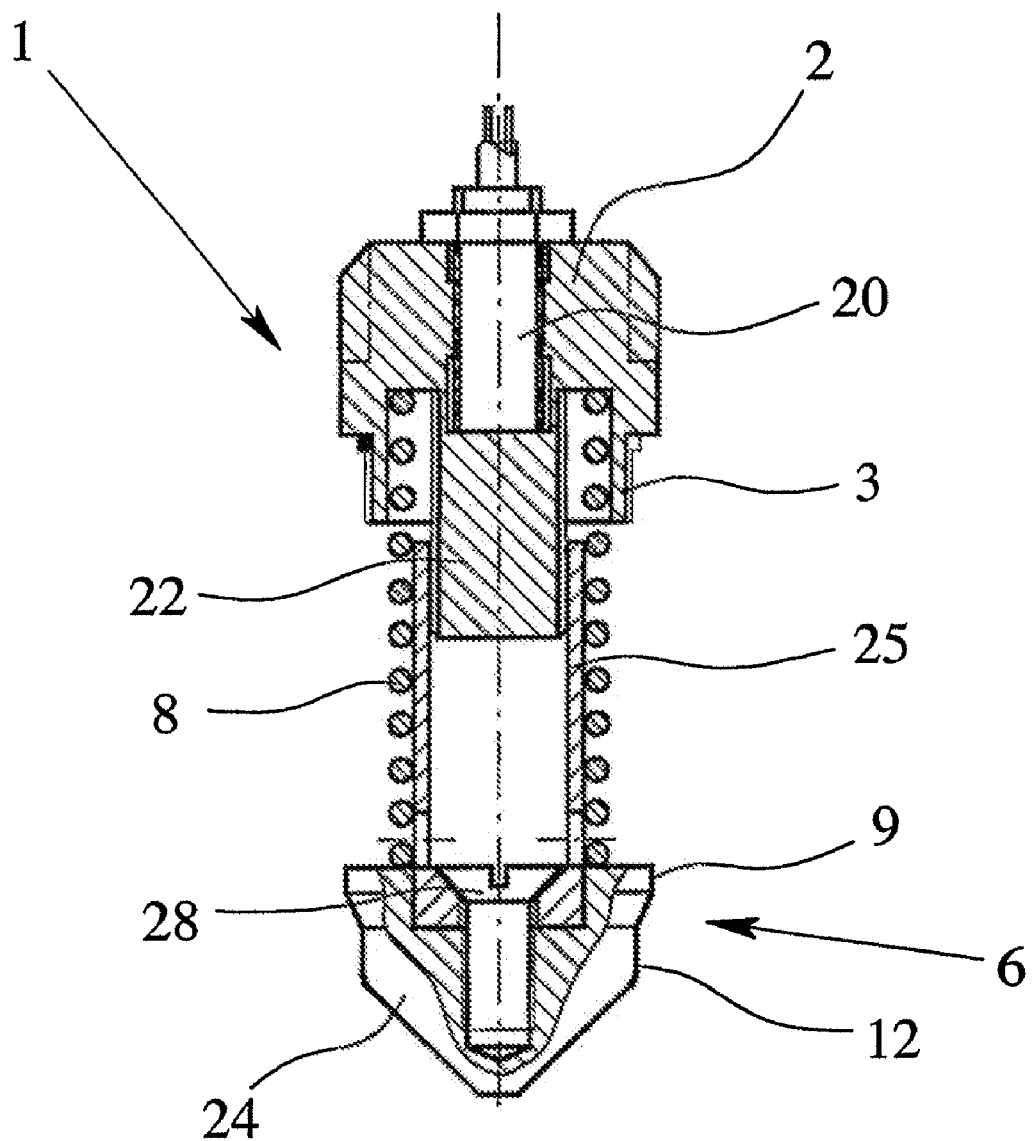
FIG. 9 is a cross-sectional view of another alternative embodiment of the flow sensor as shown in FIG. 4.
Figure 10:
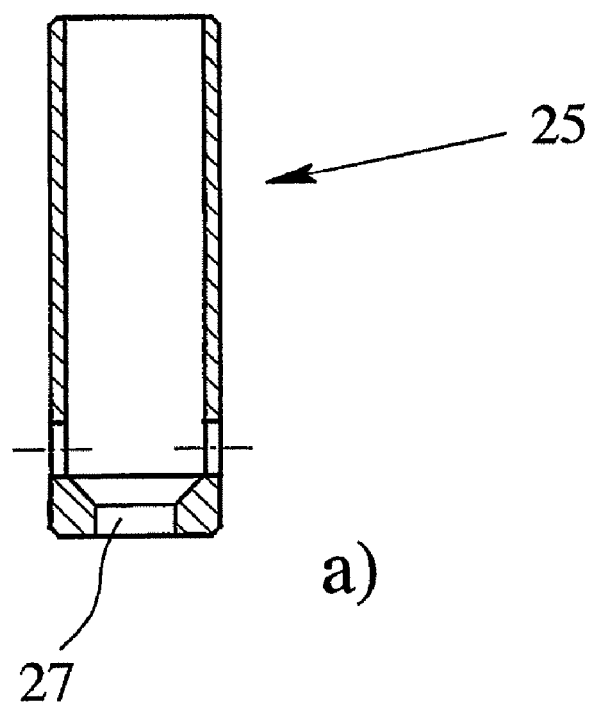
FIG. 10 is an exploded view of the two parts of the lifting body of the flow sensor shown in FIG. 9.
Figure 10:
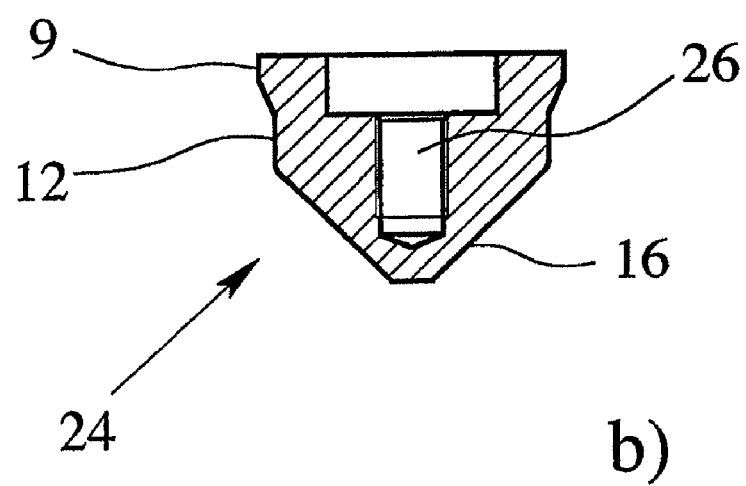

FIGS. 9 to 10 show another embodiment of a flow sensor 1 which has an inductive proximity switch 20 in which the lifting body 6 is made in two parts. The lifting body 6 has a first part 24 which faces into the interior of the pipe 5 in the installed state and a second part 25 which faces out of the interior of the pipe 5 in the installed state and which is made sleeve-shaped. The connection of the two parts 24, 25 to one another is implemented in that a blind hole 26 with an inside thread is provided in the first part 24 of the lifting body 6 and a through hole 27 is formed in the second part 25 of the lifting body 6. Then, the two parts 24, can be reliably connected to one another by means of a screw 28.

Preferably, the two parts 24, 25 of the lifting body 6 are made of different materials; the first part 24 being made, for example, of a plastic, preferably POM (polyoxymethylene) and the second part 25 being made of a metal, especially of high grade steel. This leads to the fact that two metal parts do not come into contact with one another when the flow sensor 1 is installed in a generally brass pipe union 4. Then, the plastic first part 24 of the lifting body 6 can adjoin the valve seat 10.

Finally, FIGS. 9 & 10 show that the transition between the cylindrical section 12 and the peripheral collar 9 of the lifting body 6 is frusto-conical. In this configuration of the first part 24 of the lifting body 6, the use of the O-ring 11 shown in FIGS. 1 to 7 can be eliminated.

In the embodiments of the flow sensors 1 as shown in FIG. 11, the sensor element is an inductive proximity switch 20 which is likewise mounted in the corresponding hole in the housing 2. In this connection, the end of the housing 2 of the flow sensor 1 facing toward the lifting body 6 is made as a guide pin 22 on which the sleeve-shaped end 23 of the lifting body 6 facing the housing 2 is guided. To ensure proper operation of the inductive proximity switch 20, at least the guide pin 22 of the housing 2 is made of nonmetallic material, while the lifting body 6 is made of a metallic material, so that the lifting body 6 triggers a switching process when its sleeve-shaped end 23 approaches the inductive proximity switch 20 closely enough.

The operating distance, i.e., the distance of the sleeve-shaped end 23 from the inductive proximity switch 20 for which it triggers a switching process is, for example, 3-5 mm. In this connection, the inductive proximity switch 20 remains damped as long as it dips into the sleeve-shaped end 23 of the lifting body 6. In this way, for a relatively short operating distance, a large stroke of the lifting body 6 of 20 mm or more is possible so that at a correspondingly large flow 7 the lifting body 6 can be deflected so far that the flow 7 of medium is not affected or is hardly adversely affected.

While for the flow sensor 1 as shown in FIGS. 4 to 6 the entire housing 2, including the guide pin 22, is made of plastic, for the flow sensor 1 as shown in FIG. 11, the housing 2 and the guide pin 22 are two separate components. In this connection, the housing 2 which is made of metal, especially of high grade steel, has a peripheral shoulder 29 and the plastic guide pin 22 has corresponding collar 30. The attachment of the guide pin 22 in the sleeve-shaped housing 2 takes place here using a cover 31 which is screwed onto the housing 2, by which the collar 30 of the guide pin 22 is pressed against the shoulder 29 of the housing 2.

To prevent mechanical damage and for reliable sealing, between the shoulder 29 of the housing 2 and the collar 30 of the guide pin 22 a gasket 32 is inserted into a correspondingly made groove. The inductive proximity switch 20 located in a hole 33 in the guide pin 22 is attached by a hole with an inside thread 34 being formed in the cover 31 and by the inductive proximity switch 20 being screwed into it. The special configuration of the flow sensor 1 shown in FIG. 11, with the hosing 2, the separate guide pin 22 and the cover 31 can also be used for very high pressures up to 100 bar.

Figure 12:
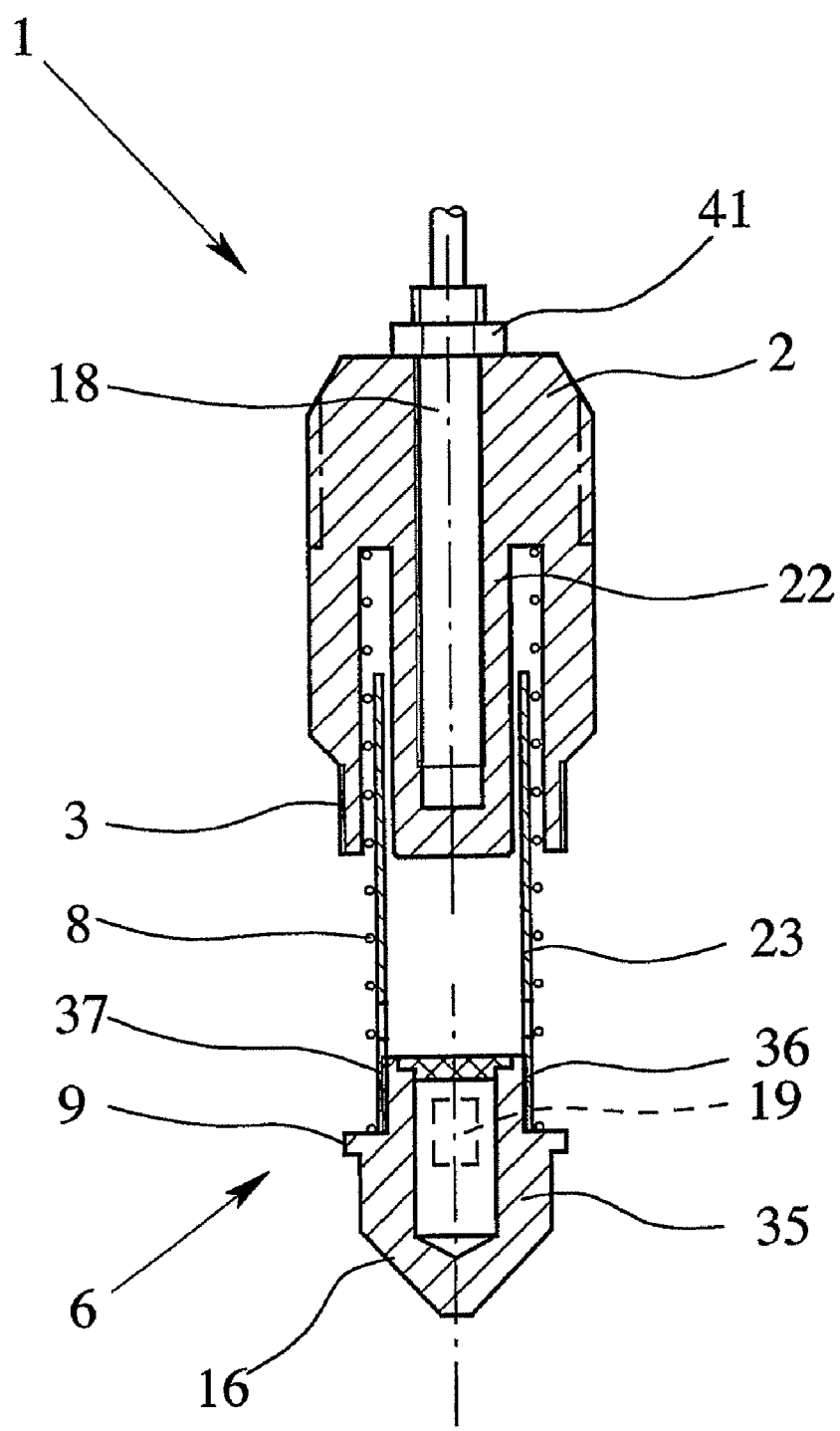
FIG. 12 is a cross-sectional view of an embodiment of a flow sensor in accordance with the invention, with a magnetic proximity switch.
Figure 13:
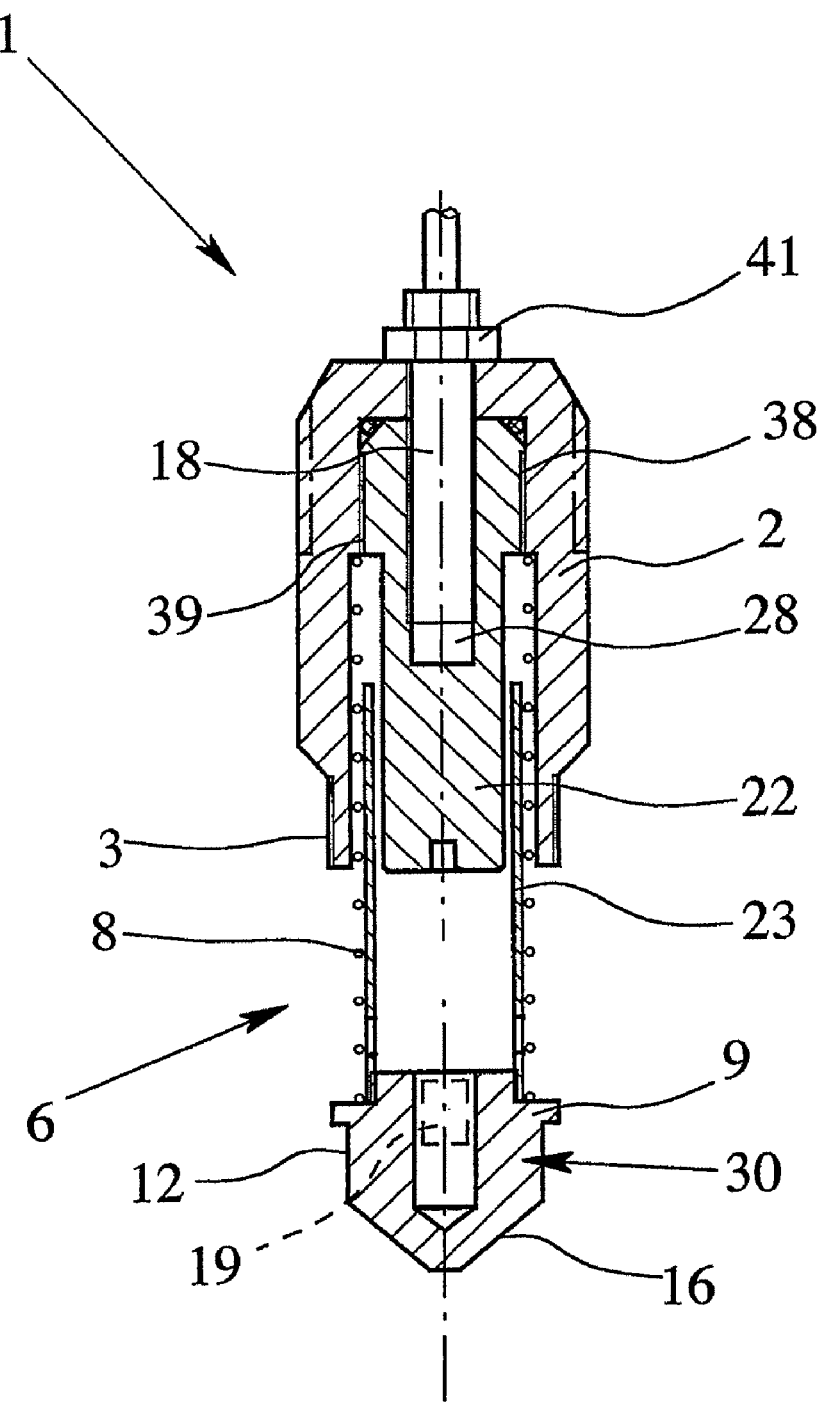
FIG. 13 is a cross-sectional view of another embodiment of a flow sensor in accordance with the invention, with a magnetic proximity switch.

In the embodiments of the flow sensor 1 as shown in FIGS. 12 & 13, the sensor element is a magnetic proximity switch 18, but in contrast to the embodiments as shown in FIGS. 1 to 3, the end of the housing 2 facing toward the lifting body 6 is made as a guide pin 22. As in the embodiments of the flow sensor 1 as shown in FIGS. 4 to 6 and 8 to 11, the end 23 of the lifting body 6 facing the housing 2 is sleeve-shaped. In this connection, the permanent magnet 19 is not located in the sleeve-shaped part 23 facing the housing 2, but in the end 35 of the lifting body 6 facing the medium. This has the advantage that the overall length of the flow sensor 1 is clearly reduced without reducing the possible stroke. Since the magnetic proximity switch 18 has a large operating distance of 20-25 mm, at the same time, the operating point accuracy is high so that very small flows 7 can be detected with this flow sensor 1. The possible large stroke 15 also ensures that, for a large flow 7, the lifting body 6 can be deflected so far that the flow 7 of the medium is hardly adversely affected. Finally, in this version, a great length of the spring element 8 can be implemented so that, even for a large stroke 15 of the lifting body 6, the spring force remains relatively constant. This also further improves the sensitivity and accuracy of the flow sensor 1.

The lifting body 6 shown in FIGS. 12 & 13 is made in two parts, specifically of the sleeve-shaped end 23 (pipe) and the solid end 35. The end 35 has an outside thread 36 and the sleeve-shaped end 23 has a corresponding inner thread 37 so that the two parts of the lifting body 6 can simply be screwed together. In this way, the possibility of variation is great, since the same sleeve-shaped end 23 can be combined with differently made solid ends 35—with a tapering tip 16 or with truncated cone-shaped tip 17, and with or without a cylindrical section 12.

Figure 14:
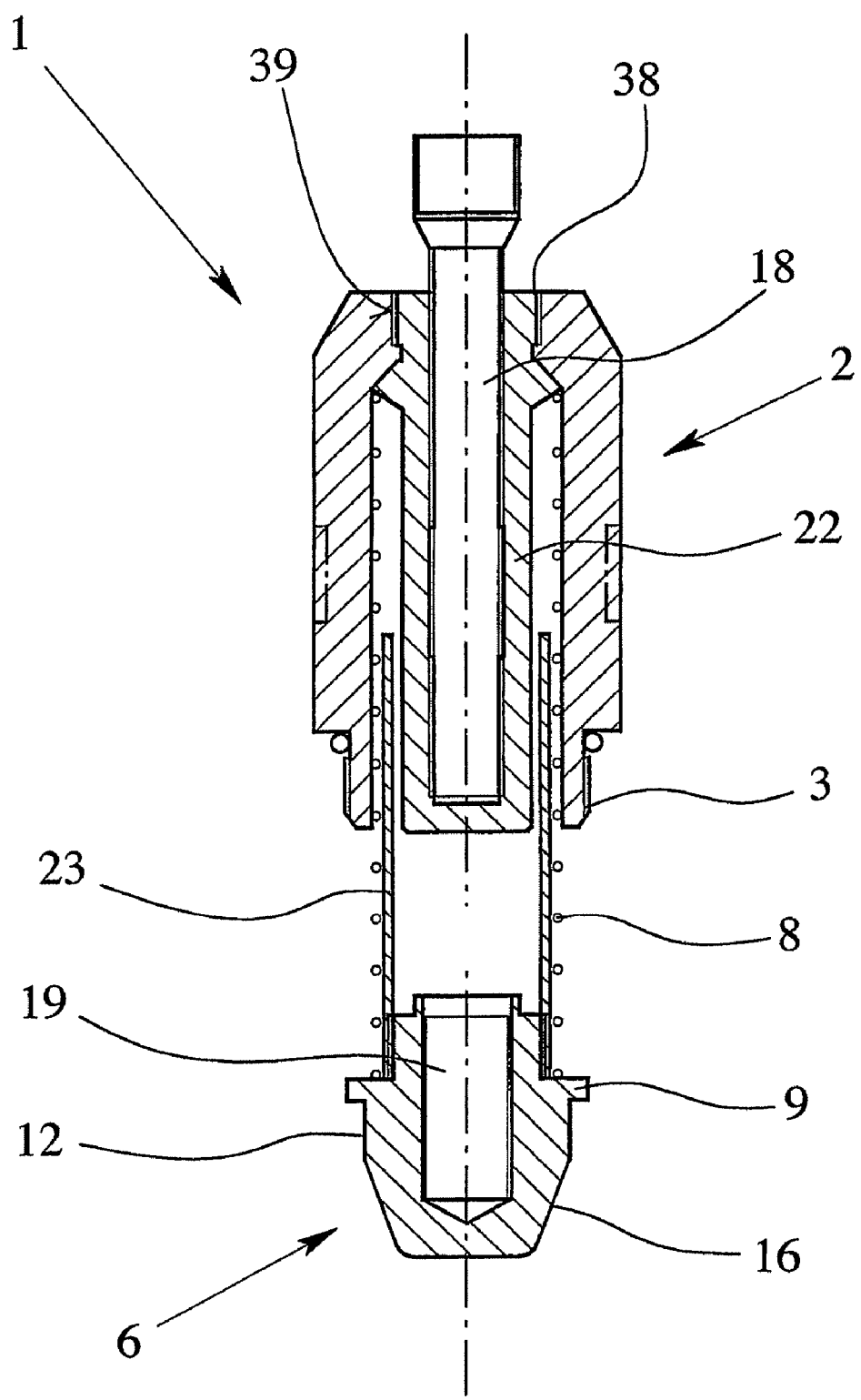
FIG. 14 is a cross-sectional view of an embodiment of a flow sensor in accordance with the invention, with a two-part housing, similar to FIG. 13, FIG. 15a & 15b are two cross-sectional views of a special version of the lifting body of a flow sensor in accordance with the invention with openings of different sizes.
Figure 15A:
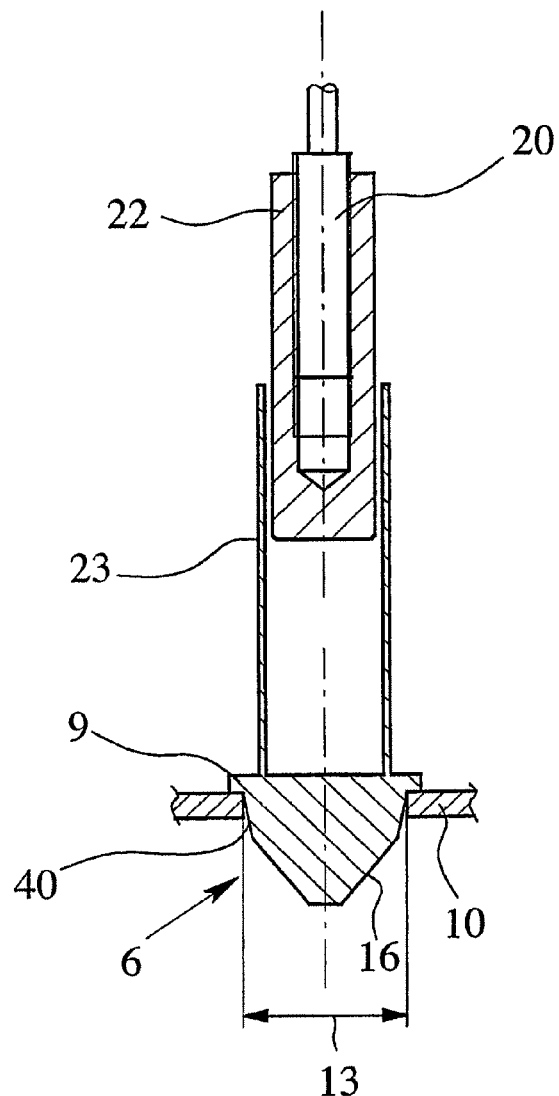
Figure 15B:
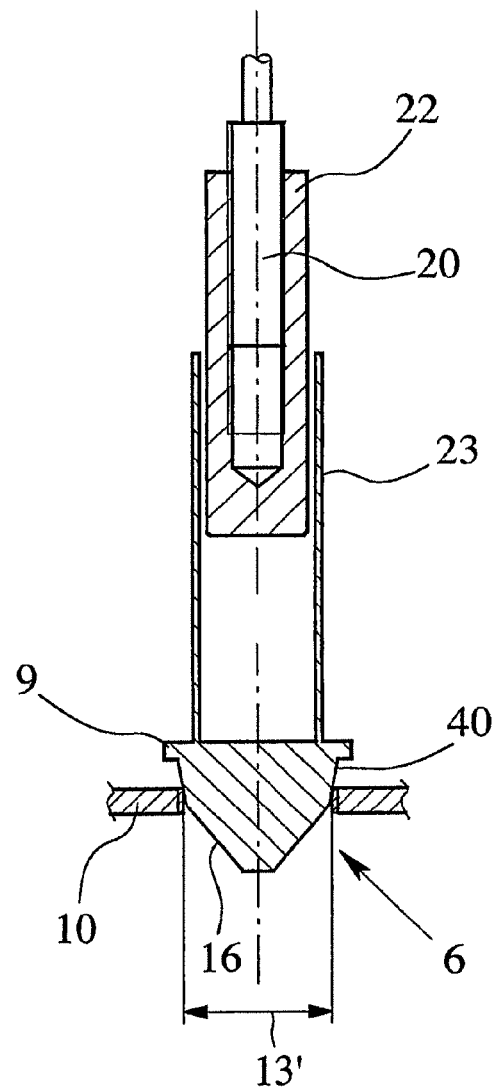

In the flow sensor 1 as shown in FIGS. 13 & 14, the housing 2 and the guide pin 22 are two separate parts, the guide pin 22 on its end facing away from the lifting body 6 having an outside thread 38 and the housing 2 having a corresponding inside thread 39 so that the guide pin 22 can be screwed into the housing 2. In this way, the possibility of variation can be further increased since the same housing 2 can now be provided with different guide pins 22. Thus, the flow sensor 1 shown in FIG. 13 can also be operated with an inductive proximity switch 20. In this case, it is simply necessary for the guide pin 22 to be made of plastic and the sleeve-shaped end 23 of the lifting body 6 to be made of metal.

FIG. 15 shows two representations of a flow sensor 1 in accordance with the invention, here, for the sake of simplification, the housing 2 has been omitted. The flow sensor 1, as shown in FIG. 15, differs from the flow sensors 1 shown in the other figures, for example, in FIGS. 12 to 14, by a special configuration of the lifting body 6. The lifting body 6 shown in FIG. 15 has a section 40 with a low conicity of a few degrees instead of a cylindrical section 12 bordering the peripheral collar 9. The angle of inclination of the section 40 can be, for example, 5° to 10°, while the angle of inclination of the conical tip 16 is roughly 45°.

The advantage of a section 40 with low conicity consists in that, in this way, tolerances in the diameter of the opening 13 can be equalized without another lifting body 6 with another diameter being required. For the embodiment shown in FIG. 15a, the diameter of the opening 13 corresponds to the maximum diameter of the section 40 with low conicity so that the lifting body 6 rests with the lower edge of the collar 9 on the valve seat 10. For the embodiment shown in FIG. 15b, conversely, the diameter of the opening 13' is somewhat smaller, so that the lifting body 6 dips less far into the opening 13' than is the case for FIG. 15a.

Ideally, the section 40 of the lifting body 6 is dimensioned such that the average diameter of the section 40 corresponds to the theoretical diameter of the opening 13. Depending on whether the actual diameter of the opening 13 is greater or less than the theoretical diameter, the lifting body with the section 40 dips more or less far into the opening 13. Thus, a lifting body 6 which can be used for openings 13 with a certain diameter range can be made available by the corresponding selection of the length and tilt angle of the section 40. The danger of jamming of the lifting body 6 in the opening 13 can be reduced by the solid part 35 of the lifting body 6 consisting of plastic.

In the above described version of the lifting body 6, since the location of the lifting body 6 changes depending on the diameter of the opening 13, in this way, the distance changes between the inductive proximity switch 20 and the end of the sleeve-shaped part 23 of the lifting body 6 which influences the inductive proximity switch 20. The starting point for flow "zero" is thus dependent on the diameter of the opening 13. Therefore, setting or adjustment of the inductive proximity switch 20 to the base position of the lifting body 6, i.e., to the flow zero point, is necessary. For this reason, the inductive proximity switch 20, and preferably also the magnetic proximity switch 18, is located in the housing 2 such that the distance of the proximity switch 18, 20 to the lifting body 6 can be adjusted.

In the simplest case, this can take place in that the proximity switch 18, 20 has an outside thread and can be screwed in the hole 33 which has an inside thread in the guide pin 22. Fixing of the proximity switch 18, 20 can take place simply using a corresponding nut 41 as is shown, for example, in FIGS. 1 to 7, 12 & 13. For a flow sensor 1 made as a switch, with a proximity switch 18, 20 which has a certain operating distance, thus the stroke 15 of the lifting body 6 necessary for triggering the operating signal can be set by turning the proximity switch 18, 20 into the housing 2 or the guide pin 22 to varying amounts. Accordingly, for an analog flow sensor 1 the flow zero point can be set by turning the proximity switch 18, 20 into the housing 2 or the guide pin 22 accordingly.

Figure 16:
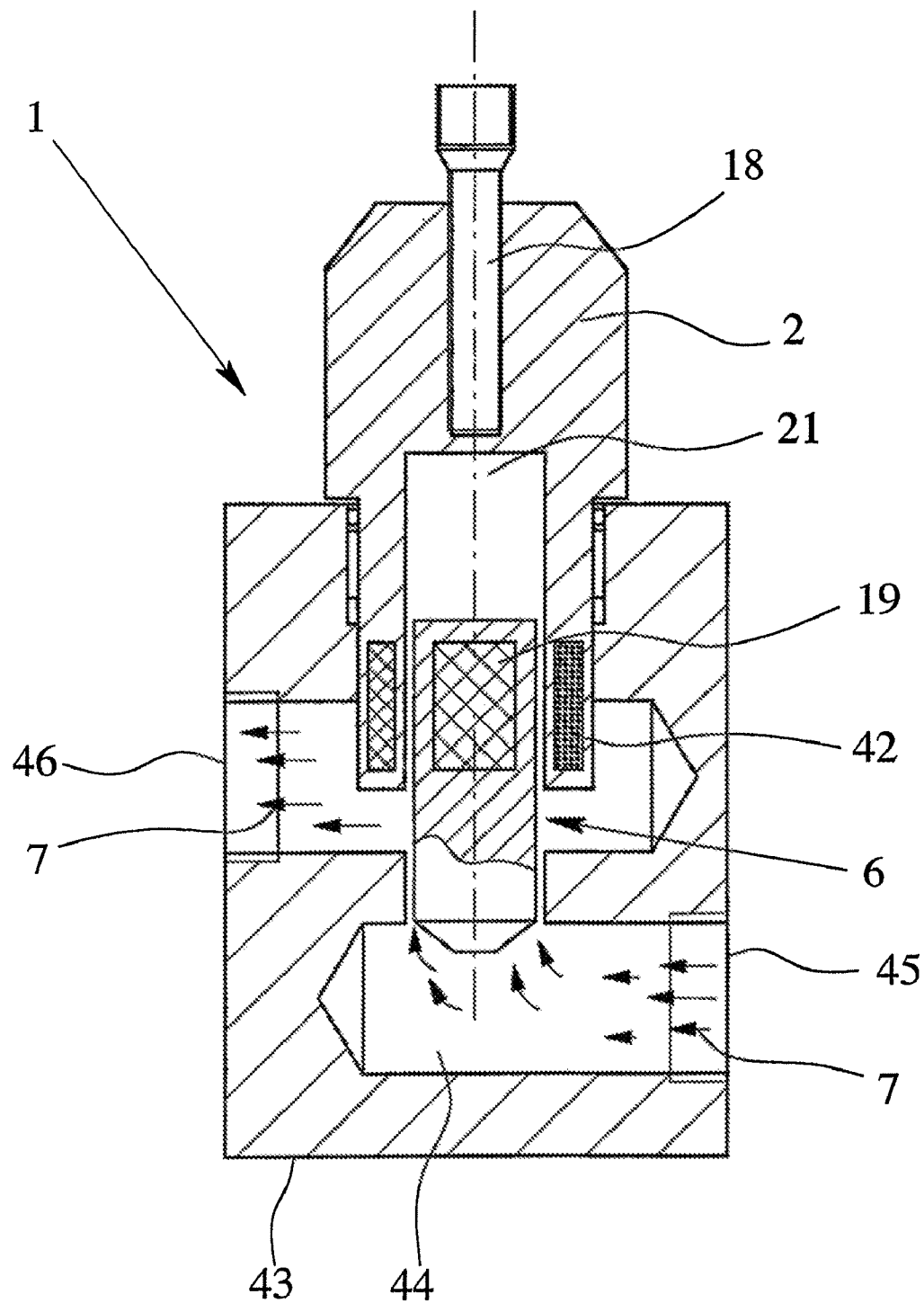
FIG. 16 is a cross-sectional view of a first embodiment of a flow sensor in accordance with the invention with an magnetic reset element.
Figure 17:
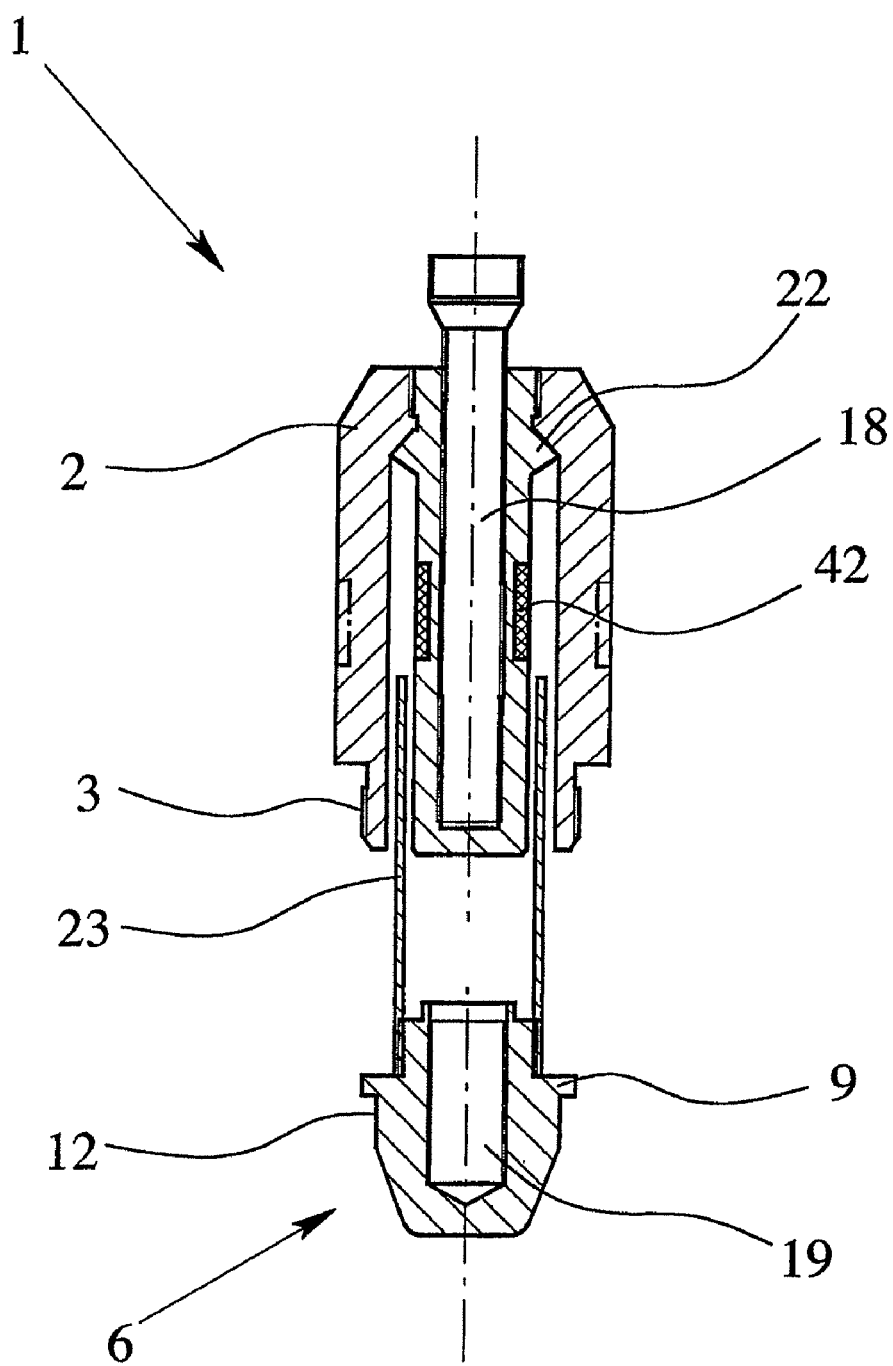
FIG. 17 is a cross-sectional view of a second embodiment of a flow sensor in accordance with the invention with an magnetic reset element.

FIGS. 16 & 17 show two embodiments of a flow sensor 1 in accordance with the invention in which the reset element between the housing 2 and the lifting body 6 is not a spring element 8, i.e., not a mechanical reset element, but a magnetic reset element. In the embodiment shown in FIG. 16, the magnetic reset element is formed by a permanent magnet 19 located in the lifting body 6 and a ring magnet 42 located coaxially thereto in the housing 2. Instead of the permanent magnet 19, there can also be an additional magnet in the lifting body 6 which together with the ring magnet 42 forms the magnetic reset element. An electromagnetic reset element can be implemented by a coil being located in the housing 2 instead of the ring magnet 42; however, a current must flow through the coil to produce the reset force. Then, the size of the reset force can also be set via the current.

The flow sensor 1 shown in FIG. 17 differs from the flow sensor 1 as shown in FIG. 16 in that there the sleeve-shaped part 23 of the lifting body 6, itself, is made magnetic. When flow occurs, then, the sleeve-shaped part 23 of the lifting body 6 is pushed over the ring magnet 42 located in the housing 2 so that with the corresponding polarity of the sleeve-shaped part 23 and ring magnet 42 the flow moves the lifting body 6 against the magnetic reset force.

The flow sensor 1 as shown in FIG. 16 is not screwed in the union 4 of the pipe 5, but into a separate connecting piece 43. In the connecting piece 43, a channel 44 with an inlet 45 and an outlet 46 is made for the flowing medium. The inlet 45 and the outlet 46 can also be made in one plane or on one side so that the channel 44 then runs essentially in a U-shape. The module comprised of the flow sensor 1 and the connecting piece 43 is, on the one hand, relatively compact but, on the other hand, can be reliably used even at relatively high pressures of more than 100 bar. The use of a prefabricated connecting piece 43 with defined dimensions, especially with respect to the cross section of the channel 44, moreover, easily enables setting of the operating point or zero point of the flow sensor 1.

Figure 18:
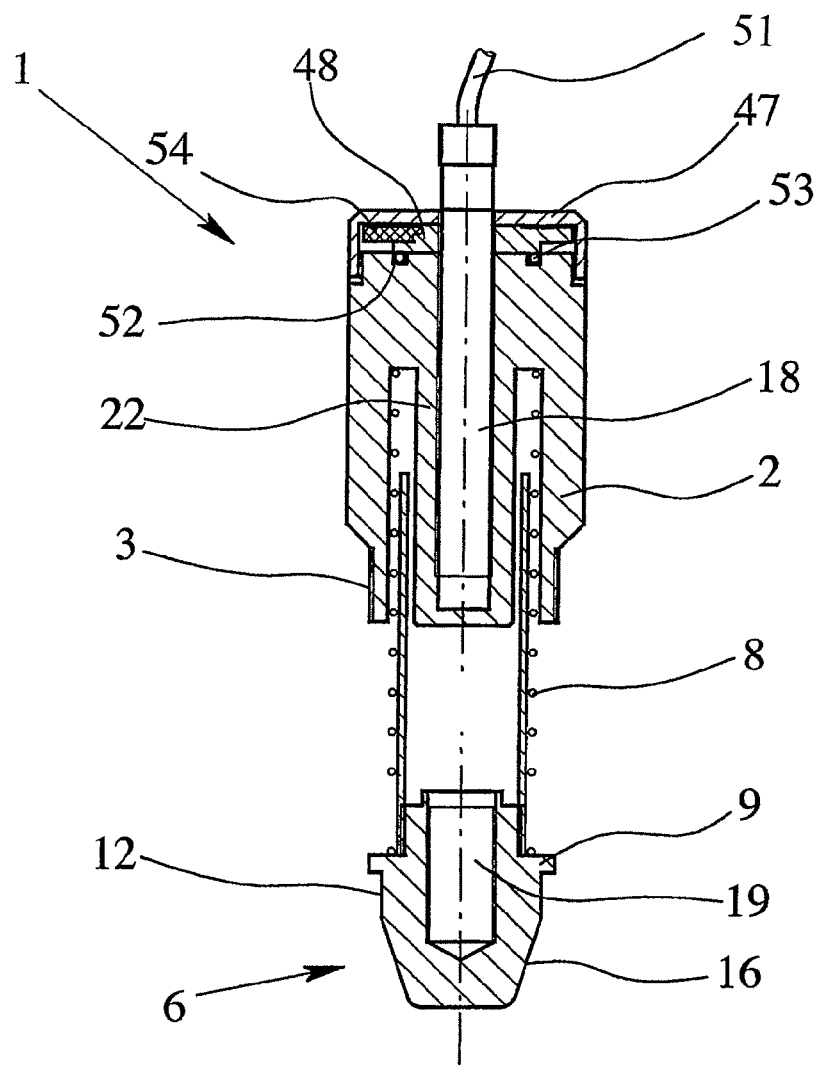
FIG. 18 is a cross-sectional view of an embodiment of a flow sensor in accordance with the invention with a magnetic proximity switch as the sensor element and with a special adjustment arrangement for the magnetic proximity switch.
Figure 19:
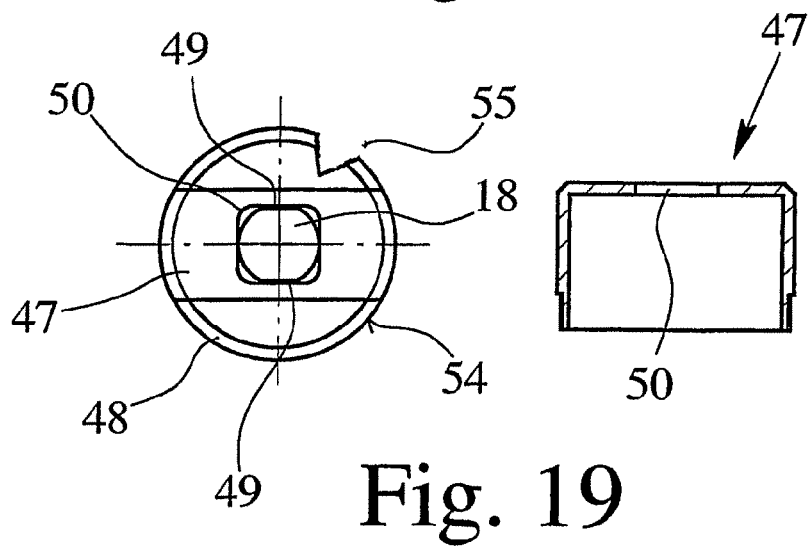
FIG. 19 shows plan and cross-sectional views of the adjustment arrangement shown in FIG. 18.

FIG. 18 shows a flow sensor 1 which is similar to the flow sensor 1 shown in FIG. 12. For the flow sensor 1 which is shown in FIG. 18, the distance of the magnetic proximity switch 18 to the lifting body 6 can be adjusted. However, this does not takes place by the magnetic proximity switch 18 being screwed directly into the guide pin 22 of the housing 2, but by using a special adjustment mechanism which is described below in conjunction with FIG. 19.

Similar to the cover 31 shown in FIG. 11, a mounting bracket 47 is screwed on the end of the housing 2 facing away from the lifting body 6, and an adjustment nut 48 is provided between the front end of the housing 2 and the mounting bracket 47. A proximity switch 18 which has an outside thread has two flattened lengthwise sides 49 opposite one another so that the proximity switch 18 has a non-round cross section. In the mounting bracket 47, an opening 50 which is matched to the cross section of the proximity switch 8 is formed so that the proximity switch 18 can be inserted through the opening 50 in the mounting bracket 47 only with the corresponding alignment of the two flattened lengthwise sides 49. The adjustment nut 48 finally has an inside thread corresponding to the outside thread of the proximity switch 18 so that the axial position of the proximity switch 18 can be adjusted, i.e. the immersion depth of the proximity switch 18 into the guide pin 22 and thus the distance of the proximity switch 18 to the lifting body 6 can be changed, by turning the adjustment nut 48.

The advantage of this adjustment mechanism which is comprised of the mounting bracket 47, the adjustment nut 48 and the proximity switch 18 which has been provided with flattened lengthwise sides is that, when the adjustment nut 48 is turned, the axial position of the proximity switch 18 is changed without the proximity switch 18 itself turning at the same time around its lengthwise axis. This inhibition of concomitant turning of the proximity switch 18 is achieved by the interaction of the flattened lengthwise sides 49 with the matched opening 50 in the mounting bracket 47. This is especially advantageous when the proximity switch 18 is already electrically connected via a connecting cable 51 since, then, twisting of the connecting cable 51 is prevented.

To prevent unwanted turning of the adjustment nut 48, in the front of the housing 2, there is a groove 52 into which an O-ring 53 is inserted, the adjustment nut 48 being pressed lightly against the O-ring 53 by the mounting bracket 47. The O-ring 53 thus acts as a "brake" for the adjustment nut 48 without however preventing intentional turning of the adjustment nut 48. For simple actuation of the adjustment nut 48 it can also have knurling 54 on its outer periphery.

Thus, the distance between the proximity switch 18, 20 and the lifting body 6 can be set very conveniently and accurately by the above described adjustment mechanism. The axial position of the proximity switch 18, 20 in the housing 2 can be read directly on the end of the proximity switch 18, 20 protruding from the housing 2. To do this, preferably a corresponding scale is applied on the flattened lengthwise side 49 of the proximity switch 18. In addition, the adjustment nut 48 can also have a marking in the form of a notch 55 so that the angle of rotation of the adjustment nut 48 can also be easily read.

Using the different versions of the flow sensor 1 in accordance with the invention which are shown in the embodiments, it is apparent that the flow sensor 1 can be used for different applications depending on the configuration. Matching to the different applications can be made simple by the possible modularity and the resulting easy replacement of individual components of the flow sensor 1. In particular, the individual components, such as the housing 2 and lifting body 6, can be made in two parts so that, for the individual components, materials matched to the respective conditions can be used. In this way, the flow sensor 1 can be used for different media, especially also for corrosive media.

In the simplest version, the flow sensor 1 is used as a binary flow indicator which alternatively has a magnetic proximity switch 18 or an inductive proximity switch 20. The setting of the operating point can be dictated either already on the production side, or can be take place flexibly by screwing the proximity switch 18, 20 into the housing 2 to a corresponding distance. Such a flow indicator is characterized by very high operating precision and very low hysteresis.

In addition, the flow sensor 1 in accordance with the invention, however, can also be used as a very precise analog sensor, i.e., as a flow meter, when the signal of the proximity switch 18, 20 is converted into an analog output signal. In this connection, a lifting body with a tapering tip or one which runs in the shape of a truncated cone is used, by which the analog output signal of the proximity switch 18, 20 is essentially linearly proportional to the flow of the medium to be monitored.

What is claimed is:

1. Flow sensor for flowing media, comprising:
   a cylindrical housing, and
   a sensor element located in the housing,
   a lifting body which, in an installed condition, is adapted to project into the flowing medium, and
   a reset element which is located between the housing and the lifting body, said reset element applying a reset force to the lifting body,
   wherein the lifting body is movably guided in the housing and being movable against the reset force of the reset element depending on the flow of the flowing medium, and
   wherein the sensor element is a noncontact proximity switch and produces a signal dependent on the position of the lifting body.

2. Flow sensor as claimed in claim 1, wherein the reset element is a spring element.

3. Flow sensor as claimed in claim 1, wherein the reset element is a magnetic reset element which comprises at least one magnet which is located in or connected to the lifting body and by at least one opposing magnet which is located coaxially in the housing relative to the at least one magnet.

4. Flow sensor as claimed in claim 1, wherein the reset element is an electromagnetic reset element which comprises at least one electromagnetic which is located in or connected to the lifting body and by an opposing coil which is located coaxially in the housing relative to the at least one electromagnetic.

5. Flow sensor as claimed in claim 3, wherein the at least one magnet in the lifting body is a bar magnet and wherein the magnet in the housing comprises at least one ring magnet.

6. Flow sensor as claimed in claim 1, wherein the lifting body has a peripheral collar, the collar being adapted to function as a check valve.

7. Flow sensor as claimed in claim 1, wherein the lifting body has a cylindrical section between an end of the lifting body which faces into the interior of the pipe in the installed state and the peripheral collar.

8. Flow sensor as claimed in claim 1, wherein the end of the lifting body projecting into the flowing medium in the installed state has a tapering tip.

9. Flow sensor as claimed in claim 1, wherein the lifting body has a section with a conicity of 0.5° to 15°.

10. Flow sensor as claimed in claim 1, wherein the sensor element is a magnetic proximity switch, and wherein a permanent magnet is provided in the lifting body, that permanent magnet being adapted to actuate the magnetic proximity switch at a predetermined distance.

11. Flow sensor as claimed in claim 10, wherein the permanent magnet located in a hole in the lifting body and wherein the hole is sealed tight with a cover.

12. Flow sensor as claimed in claim 1, wherein the sensor element is an inductive proximity switch which is installed so as not to be flush.

13. Flow sensor as claimed in claim 12, wherein the sensor head of the inductive proximity switch has a pot-type core in addition to a coil.

14. Flow sensor as claimed in claim 12, wherein the sensor head of the inductive proximity switch has an air-core inductor.

15. Flow sensor as claimed in claim 1, wherein a hole is formed in an end of the housing which faces towards the lifting body, and wherein an end of the lifting body that faces out of the interior of the pipe in the installed state is cylindrical so that the lifting body is guided in the hole.

16. Flow sensor as claimed in claim 1, wherein an end of the housing that faces towards the lifting body has a guide pin and wherein at least an end of the lifting body that faces out of the interior of the pipe in the installed state is sleeve-shaped, the inside diameter of the sleeve-shaped part of the lifting body being larger than the outside diameter of the guide pin so that the lifting body is guided on the guide pin.

17. Flow sensor as claimed in claim 16, wherein the sensor element is an inductive proximity switch, wherein the sleeve-shaped part of the lifting body is made of metal and is an actuating element for the inductive proximity switch.

18. Flow sensor as claimed in claim 16, wherein the sensor element is an inductive proximity switch, wherein the sleeve-shaped part of the lifting body is made of a plastic, and wherein at least one ring of metal is located in the sleeve-shaped part.

19. Flow sensor as claimed in claim 1, wherein the lifting body comprises two parts, a first part of the lifting body being adapted to face into the interior of the pipe in the installed state and a second part of the lifting body which is adapted to face out of the interior of the pipe in the installed state are formed of different materials.

20. Flow sensor as claimed in claim 19, wherein the first part of the lifting body has a blind hole with an inside thread and the second part of the lifting body has a through hole, and wherein the two parts of the lifting body are connected to one another by means of a screw.

21. Flow sensor as claimed in claim 16, wherein the housing and the guide pin are two separate components.

22. Flow sensor as claimed in claim 21, wherein the housing has a peripheral shoulder and the guide pin has corresponding collar, and wherein the guide pin is attached in the housing such that the collar of the guide pin fixable on the shoulder of the housing by means of a cover which is screwed onto the housing.

23. Flow sensor as claimed in claim 1, wherein the housing and the cover are made of metal.

24. Flow sensor as claimed in claim 21, wherein the guide pin on an end facing away from the lifting body has an outside thread and wherein the housing has a corresponding inside thread so that the guide pin can be screwed into the housing.

25. Flow sensor as claimed in claim 1, wherein the proximity switch is located in the housing such that the distance of the proximity switch to the lifting body is adjustable.

26. Flow sensor as claimed in claim 25, wherein a mounting bracket on the end of the housing facing away from the lifting body, wherein an adjusting nut is provided between the end of the housing and the mounting bracket, the sensor element having an outside thread with at least one flattened lengthwise side, wherein an opening matched to the cross section of the sensor element is located in the mounting bracket, and wherein the adjustment nut has an inside thread which corresponds to the outside thread of the sensor element so that by twisting the adjustment nut the axial position of the sensor element can be set without the sensor element turning at the same time.

27. Flow sensor as claimed in claim 26, wherein a groove is provided in the front of the housing in which an O-ring is held, the adjustment being pressed lightly against the O-ring by the mounting bracket.

28. Flow sensor as claimed in claim 25, wherein the position of the proximity switch in the housing is directly readable on an end of the proximity switch which protrudes from the housing.

29. Flow sensor as claimed in claim 28, wherein the housing has an outside thread so that the housing can be screwed into a union of a pipe through which the medium flows.

30. Flow sensor as claimed in claim 29, wherein the proximity switch is adapted to deliver an analog signal which is dependent on the position of the lifting body and wherein a processing unit is provided which receives the analog signal and converts it into one of a binary, analog and digital output signal.

31. Flow sensor as claimed in claim 30, further comprising a threshold switch which converts the analog signal of the proximity switch into a binary output signal.

32. Flow sensor as claimed in claim 1, wherein the housing has an outside thread and is screwable into an opening of a connecting piece.

* * * * *